United States Patent
Badr

(10) Patent No.: US 12,531,847 B2
(45) Date of Patent: Jan. 20, 2026

(54) USER DATA AND PERSONALIZATION MODELS IMPLEMENTED ON A BLOCKCHAIN

(71) Applicant: Google LLC, Mountain View, CA (US)

(72) Inventor: Ibrahim Badr, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 445 days.

(21) Appl. No.: 18/076,620

(22) Filed: Dec. 7, 2022

(65) Prior Publication Data

US 2024/0048547 A1 Feb. 8, 2024

Related U.S. Application Data

(60) Provisional application No. 63/394,758, filed on Aug. 3, 2022.

(51) Int. Cl.
*H04L 9/40* (2022.01)
*G06F 16/2457* (2019.01)
*H04L 9/00* (2022.01)

(52) U.S. Cl.
CPC .... *H04L 63/0823* (2013.01); *G06F 16/24578* (2019.01); *H04L 9/50* (2022.05)

(58) Field of Classification Search
None
See application file for complete search history.

(56) References Cited

U.S. PATENT DOCUMENTS

| | | | | |
|---|---|---|---|---|
| 11,593,515 | B2 * | 2/2023 | Blaikie, III | H04L 9/0618 |
| 11,630,914 | B2 | 4/2023 | Nakajima | |
| 2019/0121813 | A1 * | 4/2019 | Galebach | H04L 9/3239 |
| 2020/0351077 | A1 * | 11/2020 | Krishnaswamy | H04L 63/123 |
| 2021/0311931 | A1 * | 10/2021 | Prajapati | G06F 16/2458 |
| 2021/0312086 | A1 * | 10/2021 | Kim | G06F 18/214 |
| 2021/0326934 | A1 * | 10/2021 | Lawbaugh | G06Q 30/0277 |
| 2021/0390196 | A1 * | 12/2021 | Lavine | H04L 63/102 |
| 2022/0021751 | A1 * | 1/2022 | Devine | H04L 9/3234 |
| 2022/0035950 | A1 * | 2/2022 | Wakabayashi | G06F 12/1408 |
| 2022/0060514 | A1 * | 2/2022 | Hu | H04L 63/061 |
| 2022/0121731 | A1 * | 4/2022 | Groth | G06F 21/6263 |
| 2022/0245698 | A1 * | 8/2022 | Cho | G06Q 30/0627 |
| 2023/0083642 | A1 * | 3/2023 | Saginawa | H04L 63/0428 |
| | | | | 726/27 |
| 2023/0222488 | A1 * | 7/2023 | Campbell | G06Q 20/401 |
| 2023/0274287 | A1 * | 8/2023 | Blaikie, III | H04L 9/3239 |
| | | | | 705/50 |
| 2023/0289776 | A1 * | 9/2023 | Kannaiyan | G06Q 30/0621 |
| 2023/0318837 | A1 * | 10/2023 | Oh | H04L 9/3218 |
| | | | | 713/168 |
| 2023/0342495 | A1 * | 10/2023 | Turner | G06F 21/6263 |

(Continued)

*Primary Examiner* — Christopher C Harris
(74) *Attorney, Agent, or Firm* — DORITY & MANNING P.A.

(57) ABSTRACT

Systems and methods for the authorization of access to user data can include the use of one or more blockchains to store the user data and/or an authorization list. The systems and methods can receive and/or obtain an access request. The access request can be processed to determine if the requestor has authorization. The processing can include interactions with a user computing system and/or an authorization list. An authorized access can be provided such that the requestor can read the user data stored on the blockchain with limited copy and/or overwrite access.

20 Claims, 15 Drawing Sheets

(56) References Cited

U.S. PATENT DOCUMENTS

| | | | |
|---|---|---|---|
| 2024/0039721 A1* | 2/2024 | Young | H04L 9/3213 |
| 2024/0211629 A1* | 6/2024 | Ikonomov | G06F 21/604 |
| 2025/0077706 A1* | 3/2025 | Finkelstein | G06F 21/6245 |

* cited by examiner

USER DATA AND PERSONALIZATION MODELS IMPLEMENTED ON A BLOCKCHAIN

RELATED APPLICATIONS

This application claims priority to and the benefit of U.S. Provisional Patent Application No. 63/394,758, filed Aug. 3, 2022. U.S. Provisional Patent Application No. 63/394,758 is hereby incorporated by reference in its entirety.

FIELD

The present disclosure relates generally to the authorization of access to user data and/or a personalization model associated with a user. More particularly, the present disclosure relates to leveraging the data security of a blockchain for providing a secure database for user information that can be accessed by different web platforms that a user interacts with on the web or locally.

BACKGROUND

A plurality of different websites associated with a plurality of different third parties may request user data from a user. The websites can include social media websites, shopping websites, and streaming websites. Additionally, the plurality of different websites can collect and aggregate their own user-specific data for each of their plurality of users. The website specific collection and aggregation can lead to a user having their personal information stored in a plurality of different databases that the user may not be able to control.

Therefore, the user may be repetitively providing the same or similar data to a plurality of third parties. The third parties can then replicate and/or alter the data in a plurality of different ways without notice to the user. Additionally, the user may have limited control over the deletion of the data. Even for the third parties that do provide an accessible deletion feature, the user data may be stored by a plurality of third parties, which can make the deletion task tedious and, in some instances, impractical.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include receiving an access request from a third party computing system. The access request can be descriptive of a request to access user data for a particular user. In some implementations, the user data can be stored on a blockchain. The operations can include determining a particular entity associated with the third party computing system. The particular entity can be associated with a web platform. The operations can include transmitting a notification to a particular user computing system. The particular user computing system can be associated with the particular user. In some implementations, the notification can be descriptive of the access request and the particular entity. The operations can include receiving user input data from a particular user computing system. The user input data can be descriptive of a user response to the access request. The operations can include determining an access action based on the user input data. The access action can be descriptive of a level of access to be provided to the third party computing system to the user data on the blockchain.

Another example aspect of the present disclosure is directed to a computer-implemented method. The method can include receiving, by a computing system including one or more processors, an access request from a third party computing system. The access request can be descriptive of a request to access a personalization model associated with a particular user. In some implementations, the personalization model can be stored on a blockchain. The method can include determining, by the computing system, a particular entity associated with the third party computing system. The particular entity can be associated with a web platform. The method can include determining, by the computing system, an access action based on whether the particular entity is associated with one or more authorized entities. In some implementations, the one or more authorized entities can be determined based on one or more user inputs. The method can include providing, by the computing system, blockchain data associated with the particular user. The blockchain data can be associated with a particular blockchain. In some implementations, the blockchain data can include access to the personalization model.

Another example aspect of the present disclosure is directed to one or more non-transitory computer-readable media that collectively store instructions that, when executed by one or more computing devices, cause the one or more computing devices to perform operations. The operations can include receiving an access request from a third party computing system. The access request can be descriptive of a request to access user specific data associated with a particular user. In some implementations, the user specific data can be stored on a blockchain. The operations can include determining a particular entity associated with the third party computing system. The particular entity can be associated with a web platform. The operations can include determining an access action based on whether the particular entity is associated with one or more authorized entities. The one or more authorized entities can be determined based on a user selection of a user interface element in a notification. In some implementations, the notification can be descriptive of the particular entity and the access request. The operations can include providing blockchain data associated with the particular user. The blockchain data can be associated with a particular blockchain. In some implementations, the blockchain data can include access to the user specific data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
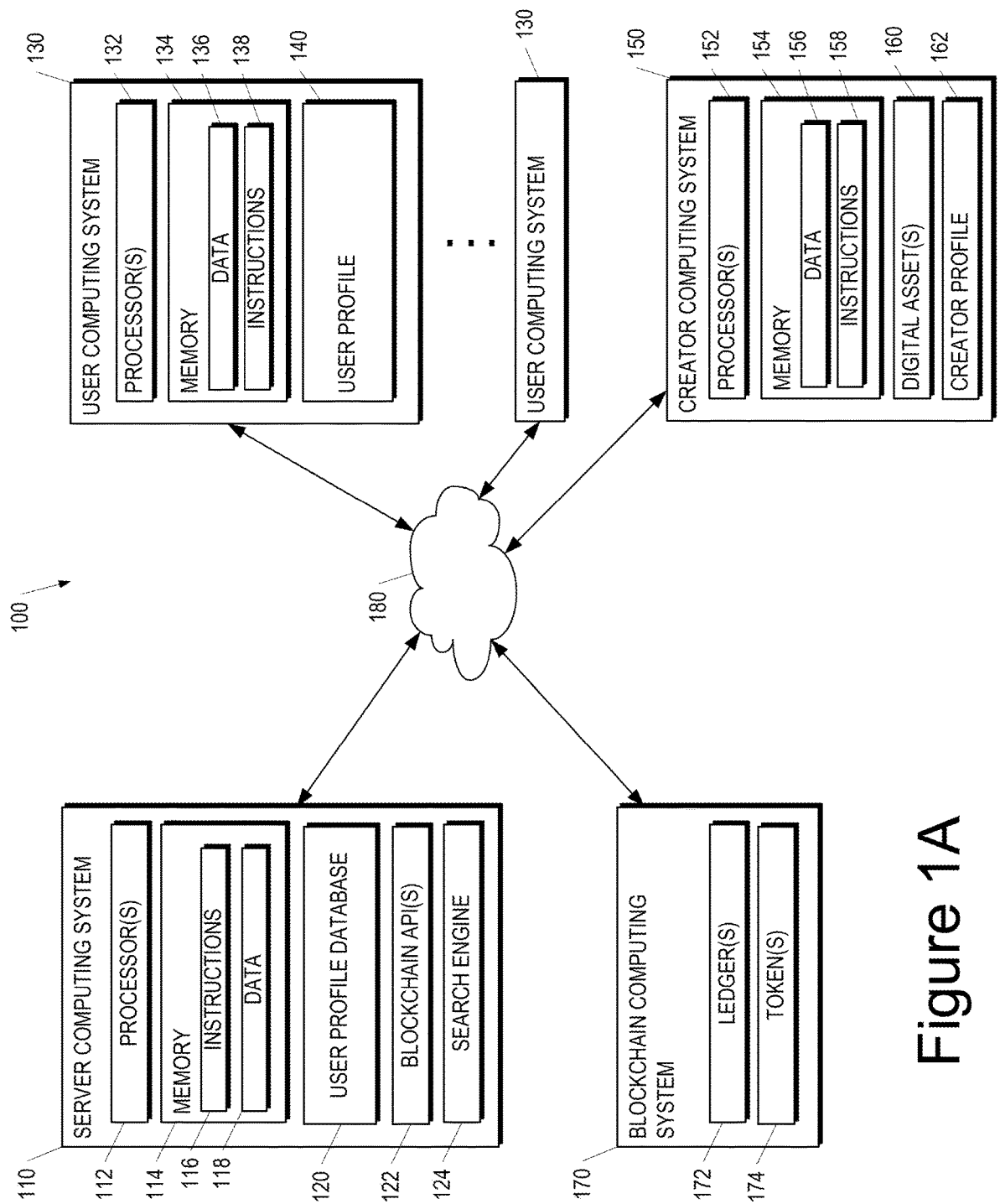
FIG. 1A depicts a block diagram of an example computing system that performs user data access authorization according to example embodiments of the present disclosure.

Reference numerals that are repeated across plural figures are intended to identify the same features in various implementations.

DETAILED DESCRIPTION

Overview

Generally, the present disclosure is directed to systems and methods for managing personalization models based on blockchain data. In particular, the systems and methods disclosed herein can leverage blockchain data to facilitate the access privileges of one or more computing systems to interact with user data. For example, the systems and methods can store user data in a blockchain and can enable that data to be used by others based on permissions associated with the blockchain.

User data such as a user's search history can be written on a blockchain and/or permissions related to the user's search history may be stored on the blockchain. The user can then control how that information is used. For example, the user can choose to share their search history with a search engine for better personalization of search results but may choose not to share their search history with a particular social media platform. More particularly, a user can control how and what specific user data is shared. For instance, the user may share some search history information but not all, etc.

In some implementations, any type of application may be able to build on top of the user data.

Additionally and/or alternatively, personalization models can be written to the blockchain. When a user navigates to a new web page that history can then be brought back, and the personalization models can be updated.

In some implementations, the systems and methods can select what data is used to update the one or more personalization models (e.g., based on permissions stored on the blockchain).

One party may write data to the blockchain (e.g., a social media platform), and the systems and methods may read the data (or vice versa).

For example, the systems and methods can include receiving an access request from a third party computing system. The access request can be descriptive of a request to access user data for a particular user. In some implementations, the user data can be stored on a blockchain. The systems and methods can include determining a particular entity associated with the third party computing system. The particular entity can be associated with a web platform. The systems and methods can include transmitting a notification to a particular user computing system. The particular user computing system can be associated with the particular user. In some implementations, the notification can be descriptive of the access request and the particular entity. User input data can be received from a particular user computing system. The user input data can be descriptive of a user response to the access request. The systems and methods can include determining an access action based on the user input data. The access action can be descriptive of a level of access to be provided to the third party computing system to the user data on the blockchain.

In particular, the systems and methods of the present disclosure can leverage a blockchain to provide a secure system for providing user data to third parties, which can limit and/or remove the ability of third parties to copy and/or edit the user data. Additionally and/or alternatively, the systems and methods can be leveraged to provide a user with the ability to wipe their information from the blockchain, which when paired with the mitigation of the ability to copy the user data can allow for a user to wipe (or erase) the user data from the internet. In some implementations, the user can facilitate the read and write access to the user data, which can allow the user to decide which and to what extent their data is stored and/or viewed. For example, the user can utilize the systems and methods disclosed herein to facilitate whether search engines, social media platforms, shopping websites, web browsers, and/or streaming services are allowed to view user-specific data. The user data can include a search history of a user, a browsing history of a user, user preferences, and/or a personalization model (e.g., a machine-learned model trained on training data associated with a user).

The systems and methods can receive an access request from a third party computing system (e.g., a third party computing system associated with a web platform). In some implementations, the access request can be descriptive of a request to access user data for a particular user. The user data can be stored on a blockchain (e.g., a distributed, decentralized blockchain that is associated with a blockchain computing system). In some implementations, the user data can include search history data descriptive of previously input search queries. The search history data can include previous search queries, search results, times of search queries, and/or a category associated with the search. The user data can include browser history data associated with the user (e.g., associated with a user computing system associated with the user). The browser history data can include previously visited web pages, times of visits, and/or other related metadata. Additionally and/or alternatively, the user data can include preference data descriptive of one or more user preferences. The preference data may have been generated based on one or more user inputs to a preference interface. Alternatively and/or additionally, the preference data may have been generated based on one or more user interactions in a previously-visited web platform. The preference data can be descriptive of notification preferences, clothes preferences and sizes, preferred addresses (e.g., preferred mailing address and/or a preferred email address), viewing preferences (e.g., dark mode versus light mode, portrait versus landscape, etc.), and/or vulgarity preference (e.g., child protection settings).

A particular entity associated with the third party computing system can be determined. The particular entity can be associated with a web platform. In some implementations, the particular entity can be a social media entity. Alternatively and/or additionally, the particular entity can be a search engine entity. The particular entity may include a transaction platform. The determination can be based on third party input data, metadata, computing system identifiers, profile data, web domain data, and/or a web address.

A notification can be transmitted to a particular user computing system. The particular user computing system can be associated with the particular user. In some implementations, the notification can be descriptive of the access request and the particular entity. The transmission can occur via a network. The notification can be generated based on the type of access request and/or based on the type of entity. The notification can be a push notification sent to a mobile device of the user (e.g., an authentication notification sent to a dual authentication mobile application). Alternatively and/or additionally, the notification can include a one-time access option, a termed access option (e.g., for a day, for a week, for a month, and/or for a year), and/or a continuous access option (e.g., to allow continuous access authorization until a future action occurs).

The systems and methods can receive user input data from a particular user computing system. The user input data can be descriptive of a user response to the access request. The user input data can be descriptive of a selection of an option provided via the user interface of the notification. The user input data can be descriptive of a user selection to provide data access to the third party computing system.

An access action can be determined based on the user input data. The access action can be descriptive of a level of access to be provided to the third party computing system to the user data on the blockchain. The level of access can be full access, restricted access, specific access, and/or no access. The access action can include instructions for causing an application programming interface to interface with a blockchain to provide access to the user data.

In some implementations, the access action can include providing the user data to the third party computing system. Alternatively and/or additionally, the access action can include providing a subset of the user data to the third party computing system. The subset of the user data can be identified and provided based in part on the user input data. For example, the user input data can include specific instructions on which data can be accessed by the particular third party computing system.

In some implementations, the access action can include generating a second notification based on the user input data and providing the second notification to the third party computing system. The second notification can be descriptive of the level of access granted. Additionally and/or alternatively, the second notification can include a user interface for accessing the user data.

Alternatively and/or additionally, the access action can include accessing a blockchain node based on the access request and identifying blockchain data associated with the particular user. The blockchain data can include the user data being requested by the third party computing system.

In some implementations, the access action can include determining identification data associated with the particular user. The identification data can be descriptive of user-specific blockchain identification information. The access action can include identifying blockchain data associated with the user based on the identification data.

Alternatively and/or additionally, the systems and methods can include receiving an access request from a third party computing system. The access request can be descriptive of a request to access a personalization model associated with a particular user. The personalization model can be stored on a blockchain. The systems and methods can include determining a particular entity associated with the third party computing system. The particular entity can be associated with a web platform. An access action can be determined based on whether the particular entity is associated with one or more authorized entities. Blockchain data associated with the particular user can be provided. The blockchain data can be associated with a particular blockchain. In some implementations, the blockchain data can include access to the personalization model.

The systems and methods can receive an access request from a third party computing system. The access request can be descriptive of a request to access a personalization model associated with a particular user. The personalization model can be stored on a blockchain. In some implementations, the personalization model can include a machine-learned model trained on user data associated with the particular user. The personalization model can be utilized to provide user-specific predictions and/or user-specific suggestions. The predictions and/or the suggestions can be based on past interactions by the user. The training data for the personalization model can include data obtained from a plurality of entities and/or a plurality of websites.

A particular entity associated with the third party computing system can be determined. The particular entity can be associated with a web platform. In some implementations, the particular entity can be a search engine entity.

An access action can be determined based on whether the particular entity is associated with one or more authorized entities. The one or more authorized entities can be determined based on one or more user inputs. Alternatively and/or additionally, the one or more authorized entities can be determined based on the entity being listed in an authorized entities list. The access action can include utilizing the personalization model to adjust a ranking of one or more search results. Alternatively and/or additionally, the access action can include obtaining additional data from the third party computing system in order to retrain the personalization model. For example, the additional data can be added to a corpus of training data, which can then be utilized to retrain the personalization model.

In some implementations, the access action can include obtaining input data from the third party computing system, processing the input data with the personalization model to generate output data, and providing the output data to the third party computing system. The output data can include search results, ranking data, prediction data, and/or suggestion data.

Alternatively and/or additionally, the access action can include adjusting one or more parameters of the personalization model based on additional data obtained from the third party computing system. The parameter adjustment can be based on additional data provided by the third party computing system.

Blockchain data associated with the particular user can be provided. The blockchain data can be associated with a particular blockchain. In some implementations, the blockchain data can include access to the personalization model.

Alternatively and/or additionally, the obtained data can be user specific data stored on the blockchain. The systems and methods can include receiving an access request from a third party computing system. The access request can be descriptive of a request to access user specific data associated with a particular user. The user specific data can be stored on a blockchain. A particular entity associated with the third party computing system can be determined. The particular entity can be associated with a web platform. The systems and methods can include determining an access action based on whether the particular entity is associated with one or more authorized entities. Blockchain data associated with the particular user can be provided. The blockchain data can be associated with a particular blockchain. In some implementations, the blockchain data can include access to the user specific data.

An access request can be received and/or obtained from a third party computing system. The access request can be descriptive of a request to access user specific data associated with a particular user. In some implementations, the user-specific data can be stored on a blockchain. The blockchain can include a particular blockchain associated with a particular blockchain computing system.

The systems and methods can determine a particular entity associated with the third party computing system. The particular entity can be associated with a web platform. The web platform can include a search engine, a social media platform, a transaction platform, a profile management platform, and/or a streaming platform.

The systems and methods can determine an access action based on whether the particular entity is associated with one or more authorized entities. The one or more authorized entities may be stored in a profile database. The profile database may be stored locally on a user computing system and/or on the blockchain.

Blockchain data associated with the particular user can then be provided. The blockchain data can be associated with a particular blockchain. The blockchain data can include access to the user-specific data. Alternatively and/or additionally, the blockchain data can include the user-specific data.

In some implementations, the systems and methods can include augmenting the user data based on third party data obtained from the third party computing system. The augmentation can include overwriting pre-existing data. Alternatively and/or additionally, the augmentation can include deleting and/or adding to pre-existing data.

Additionally and/or alternatively, the systems and methods can include generating additional data based on one or more interactions with the third party computing system and storing the additional data on the blockchain. Storing the additional data can include storing the additional data with a token ID associated with the particular user.

In some implementations, the systems and methods can include performing, via an application programming interface, an edit action. The edit action can include interacting with the blockchain. The edit action can include editing the user data associated with the particular user.

Alternatively and/or additionally, the authorization access to the user data can be based on an authorization list stored on a blockchain. For example, the systems and methods can include receiving an access request from a third party computing system. The access request can be descriptive of a request to access user data for a particular user. The systems and methods can include obtaining blockchain data associated with the user. The blockchain data can be associated with a particular blockchain. In some implementations, the blockchain data can be descriptive of one or more authorized entities allowed to access the user data. A particular entity associated with the third party computing system can be determined. The particular entity can be associated with a web platform. The systems and methods can include determining an access action based on whether the particular entity is associated with the one or more authorized entities.

The systems and methods can receive an access request from a third party computing system. The access request can be descriptive of a request to access user data for a particular user. The third party computing system can be associated with a particular web platform and/or a particular web service provider. The access request can be generated and obtained in response to a user interaction with a third party user interface.

Blockchain data associated with the user can be obtained. The blockchain data can be associated with a particular blockchain. In some implementations, the blockchain data can be descriptive of one or more authorized entities allowed to access the user data. The user data can include search history data descriptive of previously searches and/or previously viewed web pages. Alternatively and/or additionally, the user data can include preference data descriptive of one or more user preferences. The preference data may have been generated based on one or more user inputs to a preference interface. In some implementations, the preference data may have been generated based on one or more user interactions in a previously-visited web platform.

In some implementations, obtaining the blockchain data associated with the user can include accessing a blockchain node based on the access request and identifying the blockchain data associated with the user. The blockchain data can be descriptive of an authorization list that lists the one or more authorized entities.

Alternatively and/or additionally, obtaining the blockchain data associated with the user can include determining identification data associated with the user. The identification data can be descriptive of user-specific blockchain identification information. Obtaining the blockchain data associated with the user can include identifying the blockchain data associated with the user based on the identification data.

A particular entity associated with the third party computing system can be determined. The particular entity can be associated with a web platform. In some implementations, the particular entity can be a social media entity. Alternatively and/or additionally, the particular entity can be a search engine entity.

The systems and methods can determine an access action based on whether the particular entity is associated with the one or more authorized entities. The access action can include causing an application programming interface to interact with a database to obtain the user data. Alternatively and/or additionally, the access action can include providing read access to the user data. In some implementations, the access action can include providing write access to the user data.

In some implementations, the access action can include providing the user data to the third party computing system. Alternatively and/or additionally, the access action can include providing a subset of the user data to the third party computing system.

In some implementations, the access action can include generating a notification based on whether the particular entity is associated with the one or more authorized entities and providing the notification to the third party computing system.

In some implementations, the user data can be a personalization model associated with the particular user. The systems and methods can include receiving an access request from a third party computing system. The access request can be descriptive of a request to access a personalization model associated with a particular user. Blockchain data associated with the user can be obtained. The blockchain data can be associated with a particular blockchain. In some implementations, the blockchain data can be descriptive of one or more authorized entities allowed to access the personalization model. A particular entity associated with the third party computing system can be determined. The particular entity can be associated with a web platform. The systems and methods can include determining an access action based on whether the particular entity is associated with the one or more authorized entities.

The systems and methods can receive an access request from a third party computing system. The access request can be descriptive of a request to access a personalization model associated with a particular user. The personalization model can be trained based on user data obtained based on past interactions by a user. In some implementations, the personalization model can be search specific, content suggestion specific, and/or preference specific. The personalization model can be one of a plurality of personalization models associated with the particular user.

Blockchain data associated with the user can be obtained. In some implementations, the blockchain data can be associated with a particular blockchain. The blockchain data can be descriptive of one or more authorized entities allowed to access the personalization model. The personalization model can include a machine-learned model trained on user data associated with the particular user. The one or more authorized entities can be based on past user inputs obtained from a user computing system.

A particular entity associated with the third party computing system can be determined. The particular entity can be associated with a web platform. In some implementations, the particular entity can be a search engine entity. The access action can include utilizing the personalization model to adjust a ranking of one or more search results. The particular entity can be based on a Web3 profile and/or a Web3 identifier.

An access action can be determined based on whether the particular entity is associated with the one or more authorized entities. The access action can include providing the personalization model to the third party computing system for model inference. Alternatively and/or additionally, the access action can include obtaining input data from the third party computing system, processing the input data with the personalization model to generate output data, and providing the output data to the third party computing system.

Additionally and/or alternatively, the access action can include adjusting one or more parameters of the personalization model based on additional data obtained from the third party computing system.

In some implementations, the access request can be an edit request. For example, the systems and methods can include receiving an edit request from a third party computing system. The edit request can be descriptive of a request to edit user data for a particular user. The systems and methods can include obtaining blockchain data associated with the user. The blockchain data can be associated with a particular blockchain. In some implementations, the blockchain data can be descriptive of one or more authorized entities allowed to edit the user data. A particular entity associated with the third party computing system can be determined. The particular entity can be associated with a web platform. The systems and methods can include determining an edit action based on whether the particular entity is associated with the one or more authorized entities.

The systems and methods can receive an edit request from a third party computing system. The edit request can be descriptive of a request to edit user data for a particular user. The edit request can be based on the particular user being a repeat interactor with a web platform associated with the third party computing system.

Blockchain data associated with the user can be obtained. The blockchain data can be associated with a particular blockchain. In some implementations, the blockchain data can be descriptive of one or more authorized entities allowed to edit the user data.

The systems and methods can determine a particular entity associated with the third party computing system. The particular entity can be associated with a web platform. The entity determination can be based on preexisting data stored by the system in an entity database. Alternatively and/or additionally, the entity can be determined by obtaining third party data associated with the third party computing system and querying a search engine with the obtained third party data.

An edit action can be determined based on whether the particular entity is associated with the one or more authorized entities. The edit action can include augmenting the user data. The augmentation can include deleting pre-existing data. Alternatively and/or additionally, the augmentation can include adding additional data to the user data.

In some implementations, the edit action can include generating additional data based on one or more interactions with the third party computing system and storing the additional data on the particular blockchain.

In some implementations, the systems and methods can include performing, via an application programming interface, the edit action. The edit action can include interacting with the particular blockchain.

The user data, the personalization model, and/or the authorization data may be encrypted when stored on the blockchain. The encryption can utilize one or more cryptographic techniques. In some implementations, the blockchain data can include one or more pointers to the user data stored in a profile database.

The blockchain can be utilized to verify what gets accessed and what gets written, which may minimize the possibility of a bulk copy of data. Additionally and/or alternatively, the systems and methods can add search and browse history to a blockchain log. In some implementations, the systems and methods can add one or more personalization models to blockchain.

In some implementations, the user data can be utilized to determine and/or provide personalized video recommendations based on past searches (e.g., a celebrity may be searched and the recommendation may be based on the celebrity being in the video) and/or based on past web pages visited. The user may be able to select what data is saved and what data is not allowed to be documented and stored.

In some implementations, the personalization model can include a black box neural network model. The third party computing system may build a second machine-learned model on top of the personalization model.

The authorization list (e.g., a permissions list associated with the user) can be managed via a mobile application.

The systems and methods disclosed herein can allow a user to easily move data from one application to another. The user can be aggregated on the blockchain to store data from a plurality of web platforms to be later provided to a plurality of web platforms.

The user data can be stored on a blockchain with one or more token IDs associated with the user. The user data can include account IDs associated with the user and one or more web platforms.

In some implementations, the access action can include a read call and/or can include a write call.

In some implementations, virtual reality data and/or augmented-reality data can be stored on the blockchain. Additionally and/or alternatively, search history data, browsing history data, non-fungible token data, personal information, profile information, tags, application data, payment data, addresses, names, drivers license data, passport data, and identity data can be stored as part of the user data.

The systems and methods can include embedding a unique hidden code in the user data, which can be identified during scans for the hidden code or fingerprint. Additionally and/or alternatively, the systems and methods can include an application that runs on a protected virtual machine, which is utilized to read the user data to provide temporary, but not permanent, access.

The systems and methods of the present disclosure provide a number of technical effects and benefits. As one example, the system and methods can provide systems and methods for providing secure management of user data and personalization models. For example, the systems and methods disclosed herein can leverage blockchain technology to prevent the duplication and localization of the user data and can be utilized to control who can edit and/or add to the user data.

Another technical benefit of the systems and methods of the present disclosure is the ability to leverage a notification interface to provide a user interface to a user to allow for the selection of which requesters can access their data. For example, the systems and methods disclosed herein can process an access request, determine an entity associated with the requestor, generate a notification based on the request and the entity, transmit the notification, and obtain, in return, input data descriptive of whether the requestor can access the user data.

Another example of technical effect and benefit relates to improved computational efficiency and improvements in the functioning of a computing system. For example, the systems and methods disclosed herein can leverage the blockchain storage to limit the amount of power required to edit and or delete user data being utilized by a plurality of third parties. In particular, a user can augment a single dataset instead of having to navigate to a plurality of web pages to edit a plurality of datasets, which may be redundant to one another.

With reference now to the Figures, example embodiments of the present disclosure will be discussed in further detail.

Example Devices and Systems

FIG. 1A depicts a block diagram of an example computing system 100 that performs user data access authorization according to example embodiments of the present disclosure. The system 100 includes a user computing system 130, a server computing system 110, a creator computing system 150, and a blockchain computing system 170 that are communicatively coupled over a network 180.

The user computing system 130 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the user computing system 130 to perform operations.

The user computing system 130 can also include one or more user input components that receive user input. For example, the user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 110 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 118 and instructions 116 which are executed by the processor 112 to cause the server computing system 110 to perform operations.

In some implementations, the server computing system 110 includes or is otherwise implemented by one or more server computing devices. In instances in which the server computing system 110 includes plural server computing devices, such server computing devices can operate according to sequential computing architectures, parallel computing architectures, or some combination thereof.

The blockchain computing system 170 includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor to cause the blockchain computing system 170 to perform operations. In some implementations, the blockchain computing system 170 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The computing system 100 can include a number of applications (e.g., applications 1 through N). Each application can be in communication with a central intelligence layer. Example applications can include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can communicate with a central device data layer. The central device data layer can be a centralized repository of data for the computing system 100. In some implementations, the central device data layer can communicate with a number of other components of the computing device, such as, for example, one or more sensors, a context manager, a device state component, and/or additional components. In some implementations, the central device data layer can communicate with each device component using an API (e.g., a private API).

Additionally and/or alternatively, FIG. 1A depicts an exemplary computing system 100 that can be used to implement user data access authorization according to aspects of the present disclosure. The system 100 has a user-server architecture that includes a server 110 that communicates with one or more user computing systems 130 over a network 180. However, the present disclosure can be implemented using other suitable architectures, which can include any number of computing systems communicating over a network 180.

The system 100 includes a server 110, such as, for example, a web server. The server 110 can be one or more computing devices that are implemented as a parallel computing system and/or a distributed computing system. In particular, multiple computing devices can act together as a single server 110. The server 110 can have one or more processor(s) 112 and a memory 114. The server 110 can also include a network interface used to communicate with one or more remote computing devices (e.g., user devices) 130 over a network 180.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement index adjustment (e.g., index deduplication). The user profile database 120 can be configured to store a plurality of user profiles associated with a plurality of users utilizing one or more user computing systems 130. In some implementations, the user profile database 120 can be configured to be utilized for facilitating one or more interactions. The facilitation of the one or more interactions can involve the use of a blockchain application programming interface (API) 122 to send data to and receive data from a blockchain computing system 170. For example, a server computing system 110 can utilize the blockchain API 122 to update one or more ledgers 172 of the blockchain computing system 170. The one or more ledgers 172 can be associated with one or more tokens 174. The one or more tokens 174 can include one or more non-fungible tokens, which can include scripts associated with a digital asset (e.g., image data, video data, text data, latent encoding data, domain data, audio data, augmented-reality asset rendering data, and/or virtual-reality asset rendering data). In particular, the script can reference a specific digital asset that is provided for sale. The digital asset can include image data, text data, video data, latent encoding data, a domain name, a virtual property, an augmented-reality asset, a virtual-reality asset (e.g., a virtual-reality environment and/or a virtual-reality object for interaction in an environment), a smart contract, a physical item authentication, etc. In some implementations, the one or more ledgers 172 can be associated with cryptocurrency that can be utilized to make transactions in a physical marketplace and/or a virtual marketplace.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include data 118 that can be retrieved, manipulated, created, or stored by processor(s) 112. The data 118 can include search result data, ranking data, image data (e.g., digital maps, satellite images, aerial photographs, street-level photographs, synthetic models, paintings, personal images, portraits, etc.), video data, audio data, text data (e.g., books, articles, blogs, poems, etc.), latent encoding data, blockchain address data, tables, vector data (e.g., vector representations of roads, parcels, buildings, etc.), point of interest data (e.g., locales such as islands, cities, restaurants, hospitals, parks, hotels, and schools), or other data or related information. As an example, the data 118 can be used to access information and data associated with a specific digital asset, website, search result, blockchain, etc.

The data 118 can be stored in one or more databases. The one or more databases can be connected to the server 110 by a high bandwidth LAN or WAN, or can also be connected to server 110 through network 180. The one or more databases can be split up so that they are located in multiple locales.

The server 110 can exchange data with one or more user computing systems 130 over the network 180. Although two user computing systems 130 are illustrated in FIG. 1A, any number of user computing systems 130 can be connected to the server 110 over the network 180. The user computing systems 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, the user computing system 130 can be multiple computing devices acting together to perform operations or computing actions.

Similar to server 110, a user computing system 130 can include a processor(s) 132 and a memory 134. The memory 134 can store information accessible by processor(s) 132, including instructions that can be executed by processor(s) and data. As an example, memory 134 can store data 136 and instructions 138.

Instructions 138 can provide instructions for implementing a browser, a non-fungible token purchase, and/or a plurality of other functions. In particular, the user of user computing system 130 can exchange data with server 110 by using the browser to visit a website accessible at a particular web-address. The user data management of the present disclosure can be provided as an element of a user interface of a website and/or application.

The data 136 can include data related to running a specialized application on the user computing system 130. In particular, the specialized application can be used to exchange data with server 110 over the network 180. The data 136 can include user-device-readable code for providing and implementing aspects of the present disclosure. Additionally and/or alternatively, the data 136 can include data related to previously inputted or received data. For example, the data 136 can include data related to past occurrences of the special application.

The user computing system 130 can include various user input devices for receiving information from a user, such as a touch screen, touch pad, data entry keys, speakers, mouse, motion sensor, and/or a microphone suitable for voice recognition. Further, the user computing system 130 can have a display for presenting information, such as a user interface, displaying a digital asset, displaying pop-ups or application elements displayed in an interface, and/or other forms of information.

The user computing system 130 can also include a user profile 140 that can be used to identify a user of the user computing system 130. The user profile 140 can be optionally used by the user to make one or more transactions which can then be recorded on one or more ledgers 172 of the blockchain computing system 170. The user profile 140 can be descriptive of user information, which can include identification numbers and/or payment account information. For example, the user profile 140 can include data associated with a crypto wallet, which may be linked to a browser application via an application extension and/or embedding.

The user computing system 130 can further include a graphics processing unit. Graphics processing unit can be used by processor 132 to index adjustment. In some embodiments, the user computing system 130 performs any and all index adjustment.

The user computing system 130 can include a network interface for communicating with a server 110 over a network 180. Network interface can include any components or configuration suitable for communication with server 110 over network 180, including, for example, one or more ports, transmitters, wireless cards, controllers, physical layer components, or other items for communication according to any currently known or future developed communications protocol or technology.

The network 180 can be any type of communications network, such as a local area network (e.g., intranet), wide area network (e.g., Internet), or some combination thereof. The network 180 can also include a direct connection between user computing system 130 and the server 110. In general, communication between the server 110 and a user computing system 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the exemplary computing system 100 can include one or more creator computing systems 150. The one or more creator computing systems 150 can be utilized for generating images, videos, prose, poetry, audio, etc., which can then be provided for sale. The one or more creator computing systems 150 can include one or more processors 152, which can be utilized to execute one or more operations to implement the systems and methods disclosed herein. The one or more creator computing systems 150 can include one or more memory components 154, which can be utilized to store data 156 and one or more instructions 158. The data 156 can include data related to one or more applications, one or more media datasets, etc. The instructions 158 can include one or more operations for implementing the systems and methods disclosed herein.

The one or more creator computing systems 150 can store data associated with one or more digital assets 160 and/or one or more creator profiles 162. The one or more digital assets 160 can include text data, image data, video data, audio data, latent encoding data, domain data, or a variety of other data formats. The one or more creator profiles 162 can include information associated with one or more "creators" of the one or more digital assets 160. The one or more creator profiles 162 can include identification data, transaction data, and/or crypto wallet data.

Additionally and/or alternatively, the exemplary computing system 100 can include one or more blockchain computing systems 170. The one or more blockchain computing systems 170 can include a plurality of computing devices being utilized for decentralized data storage, such that a plurality of "blocks" can be distributed throughout a network of computing devices to provide a secure system for data storage, which can include one or more ledgers 172 and one or more tokens 174. In some implementations, each of the one or more tokens 174 can be associated with at least a portion of the one or more ledgers 172.

Blockchain can refer to a system configured to securely record information. The blockchain can include a decentralized system that can render changing information extremely difficult. The blockchain can include a digital ledger of transactions that can be duplicated and distributed across a network of computing systems. Each block in the chain can include a number of transactions. When a new transaction occurs on the blockchain, a record of that transaction can be added to every computing device's ledger. The blockchain can be utilized to track the exchange of currency and/or digital assets via the recording of transactions on the digital ledger, which can be propagated throughout the decentralized system. The currency exchanged and tracked via the blockchain computing system 170 can be referred to as cryptocurrency.

The tokens 174 can include one or more non-fungible tokens. The non-fungible tokens can be minted on a blockchain associated with the blockchain computing system 170. A non-fungible token (NFT) can be a certificate of authenticity of a digital asset. NFTs can be non-interchangeable thus making their worth depend on the price anyone may be willing to pay for the asset. NFTs can be printed on blockchains such that their scarcity and authenticity can be maintained. A digital asset can be defined as anything that is stored digitally and can be uniquely identifiable that organizations can use to realize value. Examples of digital assets can include a tweet, a social media comment, documents, audio, images, videos, logos, website domains, slide presentations, spreadsheets, CSS files and formats, executable code, and/or websites.

Figure 1B:
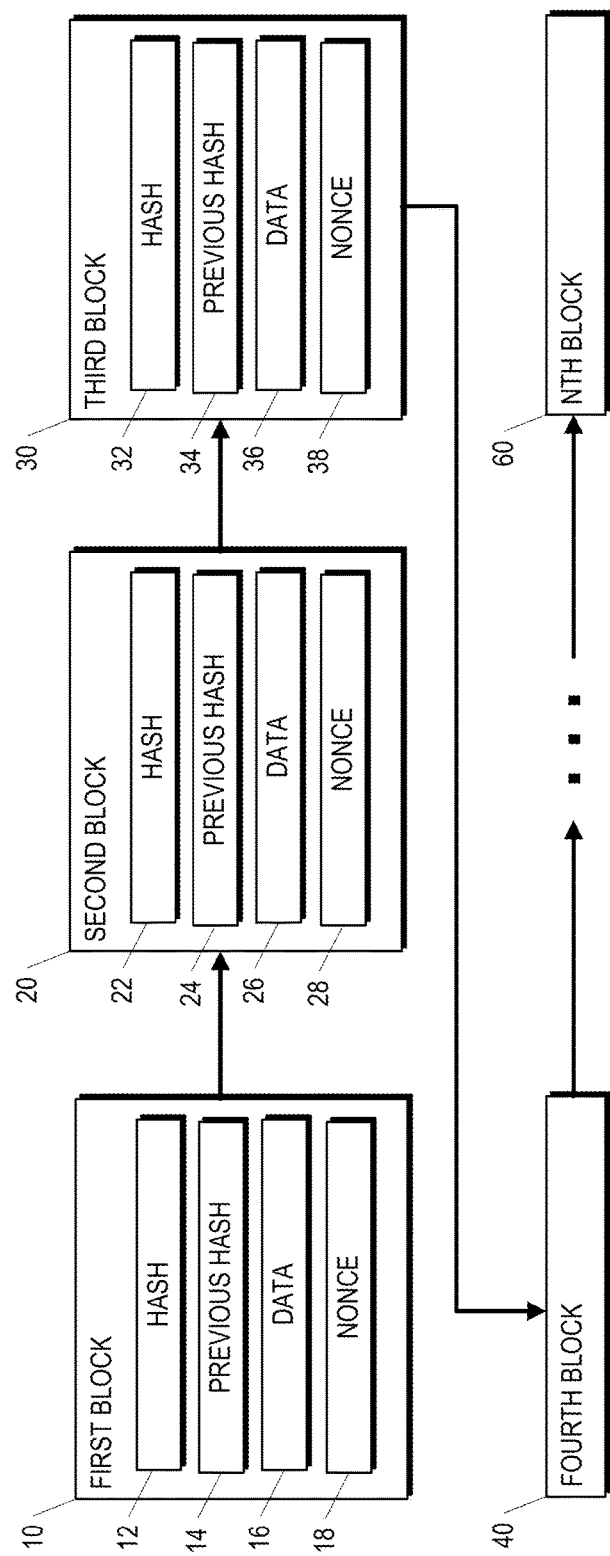
FIG. 1B depicts a block diagram of an example computing device that performs user data access authorization according to example embodiments of the present disclosure.

FIG. 1B depicts a block diagram of an example blockchain 50 that may be utilized by the blockchain computing system 170 of the exemplary computing system 100 of FIG. 1A. The example blockchain 50 can include a plurality of blocks that can be utilized to store data with one or more cryptographic features. The blockchain 50 can be stored on a decentralized computing system comprising a plurality of computing devices. The blockchain 50 can be a public blockchain (e.g., a blockchain that is open without access restrictions such that anyone with an internet access can send transactions or validate transactions as part of the decentralized, distributed system), a private blockchain (e.g., a blockchain that provides access based on permissions set by network administrators), or a hybrid blockchain (e.g., a blockchain with a combination of blocks with no restrictions and blocks with restrictions). The blockchain 50 can include proof of work features that can include one or more cryptographic forms of proof. The proof of work can be provided upon a request to update the blockchain 50 (e.g., a request to update the ledgers based on a new transaction). The proof of work can convey that a certain device or group of devices have performed a certain amount of computation, which can then be validated by other parties. Once validated, the blockchain 50 can be updated, or may remain unchanged in response to a failure to validate. The proof of work feature can be utilized to mitigate the computational cost of every device in the system having to perform the same computational functions and checks for determining a request is valid for updating the blockchain 50.

Each block can include a hash, a previous hash associated with the hash of the previous block, and data. In some implementations, each block can include a nonce. A hash can be a hash value of a fixed length that can be a fingerprint for the particular block. The hash value can be generated based on a hash function and may be changed each time a change is made to the data of that particular block. The previous hash can include a hash value of the block immediately preceding the particular block. The previous hash can be utilized to ensure the downstream ground truth stays unchanged unless proper validation occurs. The data can include transaction data (e.g., a transaction ledger), a timestamp, a value associated with a cryptocurrency value, a non-fungible token (e.g., a non-fungible token including a script that references a digital asset, nonce data, and/or general blockchain data. Nonce (i.e., a number only used once) can be a number added to a block in a blockchain that can meet a difficulty level restriction when a block is rehashed. The nonce can be a number that blockchain miners are solving for, in order to receive an incentive (e.g., cryptocurrency).

The blockchain 50 can include one or more security protocols and/or features. The blockchain 50 can include a cryptographic system. For example, the blockchain 50 can validate the blockchain 50 is valid by ensuring the stored previous hash stored in the block matches the hash value of the previous block from the last block back to the first block (e.g., the genesis block). In some implementations, the blockchain 50 can include proof of work validation that can rely on verifying proof of computation before implementing a change to the stored data (e.g., the stored ledger). Proof of work validation can take seconds, minutes, and/or hours based in part on the number of blocks in the blockchain 50. Additionally and/or alternatively, the blockchain 50 can be implemented on a distributed, decentralized computing system. In some implementations, each computing device in the distributed, decentralized computing system can store a portion of (e.g., a block of the plurality of blocks) or all of the blocks in the blockchain 50. Therefore, the system can verify data by ensuring the data is uniform across most, if not all, of the distributed system. Each node of the distributed system can be checked for tampering before adding new data.

The data can include data associated with a cryptocurrency value (e.g., a ledger associated with a specific cryptocurrency value), data associated with a digital asset (e.g., a non-fungible token minted on the blockchain 50 that can include a script associated with the digital asset), data associated with a smart contract (e.g., a smart contract that includes conditions that automatically initiates an action in response to a criteria being met), and/or timestamp data (e.g., timestamp data for block creation, minting, a transaction, etc.).

In particular, FIG. 1B depicts a first block 10, a second block 20, a third block 30, a fourth block 40, and an nth block 60. Although five blocks are depicted, any number of blocks can be utilized. The first block 10 can be a genesis block (e.g., a first overall block in the blockchain). The first block 10 can include a respective first hash 12 (e.g., a hash value associated with the first block 10). The first block 10 may include a first previous hash 14 (e.g., if the first block 10 has a block before it in the blockchain 50, then the hash of the previous block can be stored on the first block 10). Additionally and/or alternatively, the first block 10 can include data 16 and nonce 18.

The second block 20 can follow the first block 10. The second block 20 can include a respective second hash 22 (e.g., a hash value associated with the second block 20). The second block 20 may include a second previous hash 24 (e.g., the second previous hash 24 can be the same as, or reference, the first hash 12). Additionally and/or alternatively, the second block 20 can include data 26 and nonce 28.

The third block 30 can follow the second block 20. The third block 30 can include a respective third hash 32 (e.g., a hash value associated with the third block 30). The third block 30 may include a third previous hash 34 (e.g., the third previous hash 34 can be the same as, or reference, the second hash 22). Additionally and/or alternatively, the third block 30 can include data 36 and nonce 38.

Additionally and/or alternatively, the fourth block 40, the nth block 60, and other potential blocks can include a respective hash, a respective previous hash, and data. The first data 16, the second data 26, the third data 36, and the data of the other blocks can include overlapping data, can differ, and/or be the same such that the data is duplicative for all blocks. In some implementations, each block can be associated with a different transaction (e.g., a different minting, a different sale, etc.). The first nonce 18, the second nonce 28, the third nonce 38, and the nonce's of the other blocks can differ and may be solved during mining.

The data in each block can include ledger data, which can include a timestamp, asset and/or cryptocurrency exchanged, actors involved in transaction, and/or a variety of other information.

In some implementations, a plurality of different blockchains can be utilized for the systems and methods disclosed herein. The different blockchains can include different configurations. The different blockchains can include parallel chains, side chains, shared blocks, differing chains, varying permissions, varying purposes, varying number of blocks, and/or varying hash functions and/or varying hashing value lengths.

In some implementations, the systems and methods can include one or more machine-learned model computing systems 900. The one or more machine-learned models can be utilized for a variety of tasks for enabling token data identification, obtainment, indexing, and deduplication.

Figure 9A:
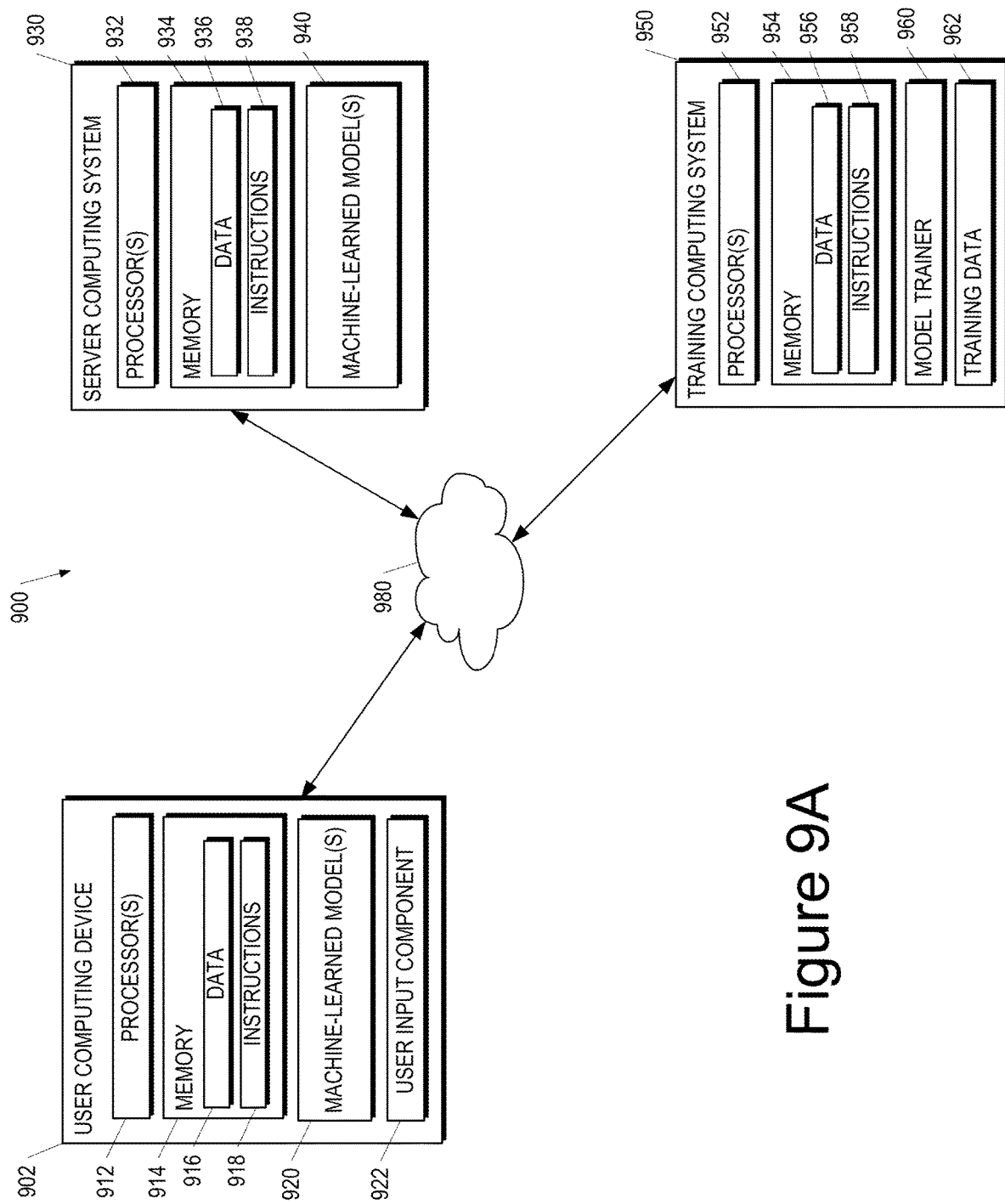
FIG. 9A depicts a block diagram of an example computing system that performs user data access authorization according to example embodiments of the present disclosure.

FIG. 9A depicts a block diagram of an example computing system 900 that performs user data access authorization according to example embodiments of the present disclosure. The system 900 includes a user computing device 902, a server computing system 930, and a training computing system 950 that are communicatively coupled over a network 980.

The user computing device 902 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing device 902 to perform operations.

In some implementations, the user computing device 902 can store or include one or more personalization models 920. For example, the personalization models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example personalization models 920 are discussed with reference to FIGS. 2 & 3.

In some implementations, the one or more personalization models 920 can be received from the server computing system 930 over network 980, stored in the user computing device memory 914, and then used or otherwise implemented by the one or more processors 912. In some implementations, the user computing device 902 can implement multiple parallel instances of a single personalization model 920 (e.g., to perform user-specific prediction or suggestion across multiple instances of third party service providers).

More particularly, the personalization model 920 can include one or more detection models, one or more segmentation models, one or more classification models, one or more augmentation models, one or more generation models, and/or one or more feature extractor models. The personalization model 920 can process input data to generate a suggestion and/or a prediction specific to the particular user.

Additionally or alternatively, one or more personalization models 940 can be included in or otherwise stored and implemented by the server computing system 930 that communicates with the user computing device 902 according to a client-server relationship. For example, the personalization models 940 can be implemented by the server computing system 930 as a portion of a web service (e.g., a personalization service). Thus, one or more models 920 can be stored and implemented at the user computing device 902 and/or one or more models 940 can be stored and implemented at the server computing system 930.

The user computing device 902 can also include one or more user input components 922 that receive user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned personalization models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIGS. 2 & 3.

The user computing device 902 and/or the server computing system 930 can train the models 920 and/or 940 via interaction with the training computing system 950 that is communicatively coupled over the network 980. The training computing system 950 can be separate from the server computing system 930 or can be a portion of the server computing system 930.

The training computing system 950 includes one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the training computing system 950 to perform operations. In some implementations, the training computing system 950 includes or is otherwise implemented by one or more server computing devices.

The training computing system 950 can include a model trainer 960 that trains the machine-learned models 920 and/or 940 stored at the user computing device 902 and/or the server computing system 930 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 960 can perform a number of generalization techniques (e.g., weight decays, dropouts, etc.) to improve the generalization capability of the models being trained.

In particular, the model trainer 960 can train the personalization models 920 and/or 940 based on a set of training data 962. The training data 962 can include, for example, training blockchain data, training web page data, training transaction data, ground truth labels, ground truth information, and/or ground truth segmentation masks.

In some implementations, if the user has provided consent, the training examples can be provided by the user computing device 902. Thus, in such implementations, the model 920 provided to the user computing device 902 can be trained by the training computing system 950 on user-specific data received from the user computing device 902. In some instances, this process can be referred to as personalizing the model.

The model trainer 960 includes computer logic utilized to provide desired functionality. The model trainer 960 can be implemented in hardware, firmware, and/or software controlling a general purpose processor. For example, in some implementations, the model trainer 960 includes program files stored on a storage device, loaded into a memory and executed by one or more processors. In other implementations, the model trainer 960 includes one or more sets of computer-executable instructions that are stored in a tangible computer-readable storage medium such as RAM hard disk or optical or magnetic media.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 9A illustrates one example computing system that can be used to implement the present disclosure. Other computing systems can be used as well. For example, in some implementations, the user computing device 902 can include the model trainer 960 and the training dataset 962. In such implementations, the models 920 can be both trained and used locally at the user computing device 902. In some of such implementations, the user computing device 902 can implement the model trainer 960 to personalize the models 920 based on user-specific data.

Figure 9B:
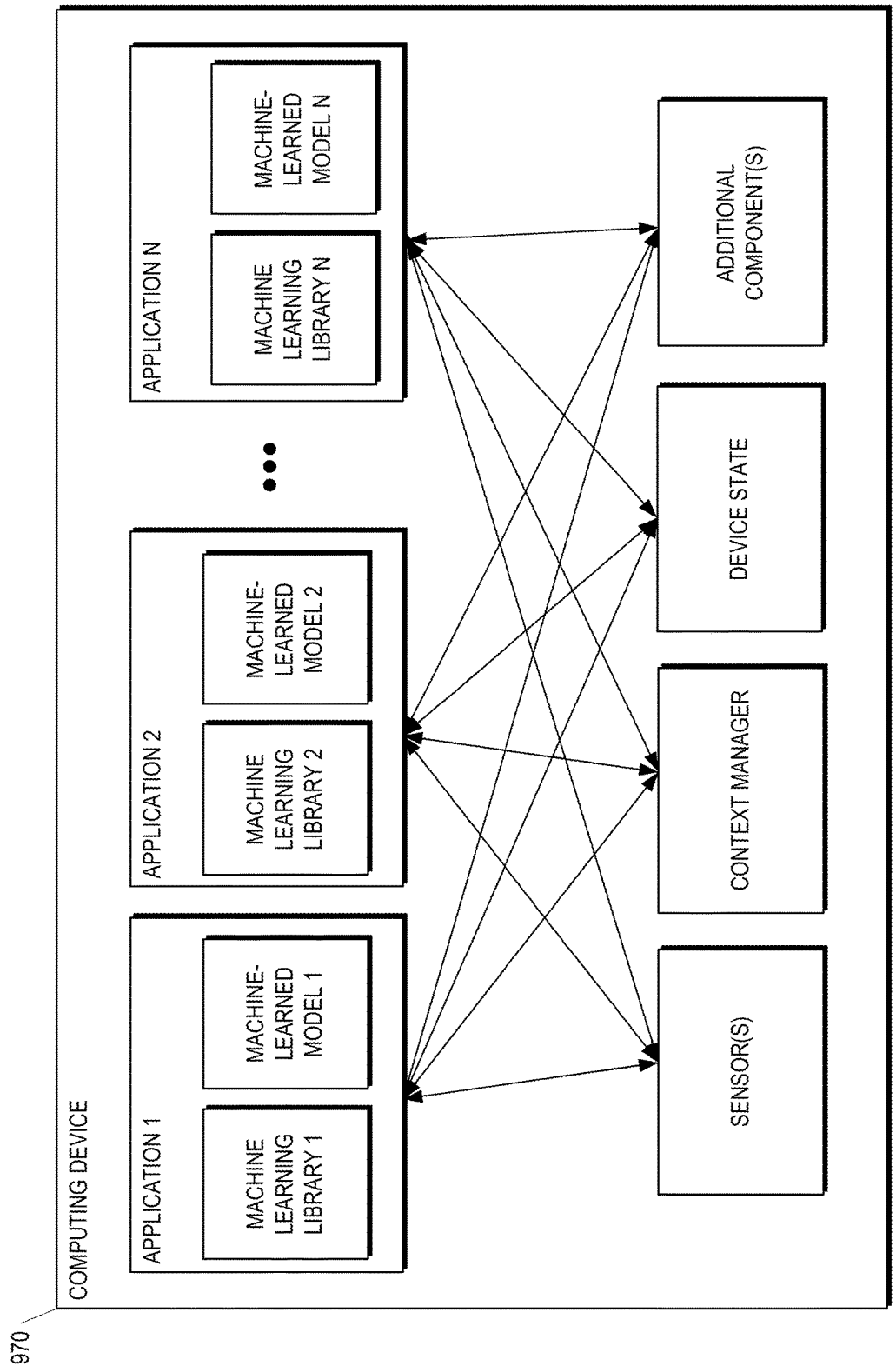
FIG. 9B depicts a block diagram of an example computing device that performs user data access authorization according to example embodiments of the present disclosure.

FIG. 9B depicts a block diagram of an example computing device 970 that performs according to example embodiments of the present disclosure. The computing device 970 can be a user computing device or a server computing device.

The computing device 970 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
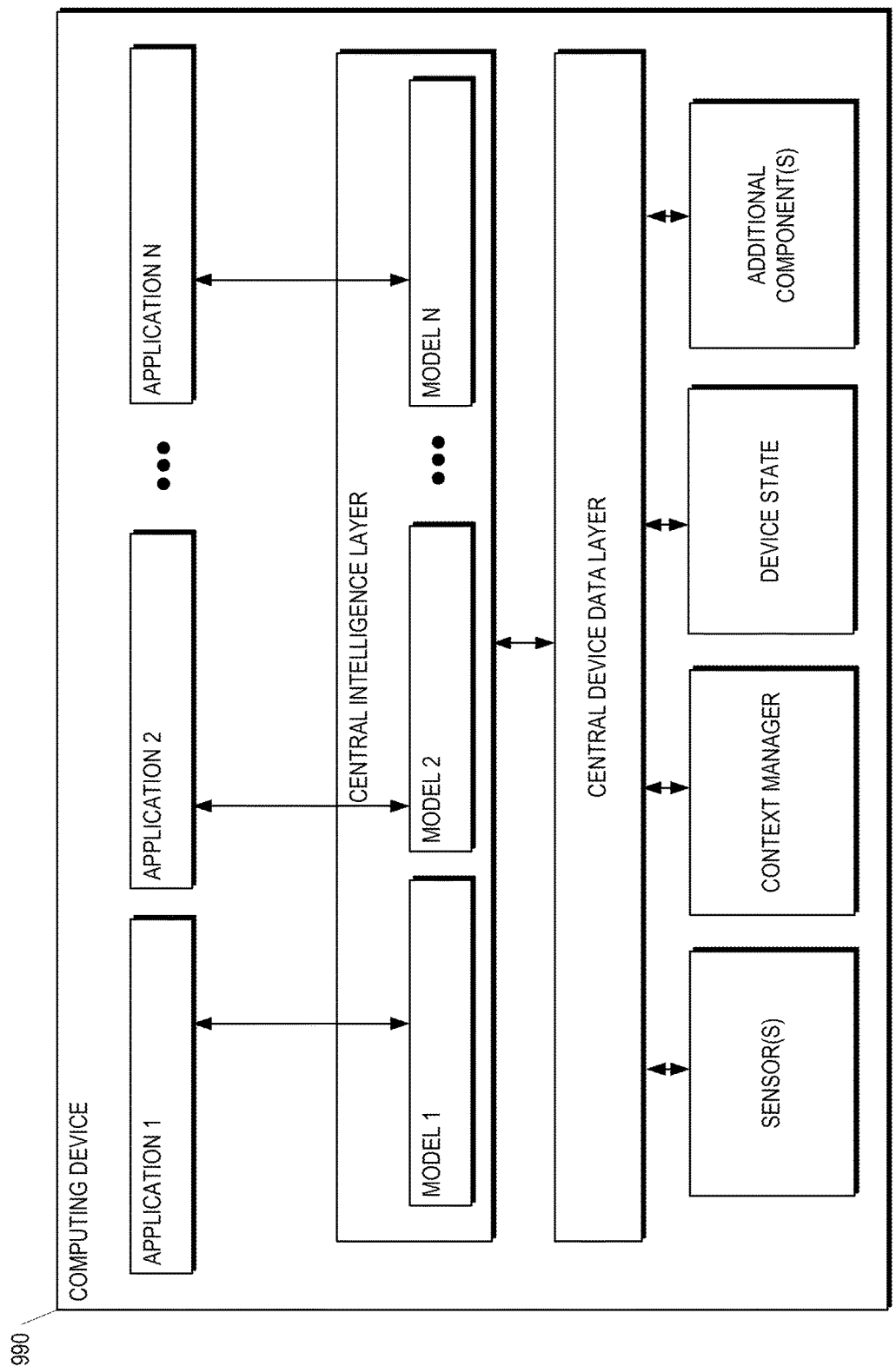
FIG. 9C depicts a block diagram of an example computing system that performs user data access authorization according to example embodiments of the present disclosure.

FIG. 9C depicts a block diagram of an example computing device 990 that performs according to example embodiments of the present disclosure. The computing device 990 can be a user computing device or a server computing device.

The computing device 990 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 990.

The central intelligence layer can communicate with a central device data layer. The central device data layer can be a centralized repository of data for the computing device 990. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

Example System Arrangements

Figure 2:
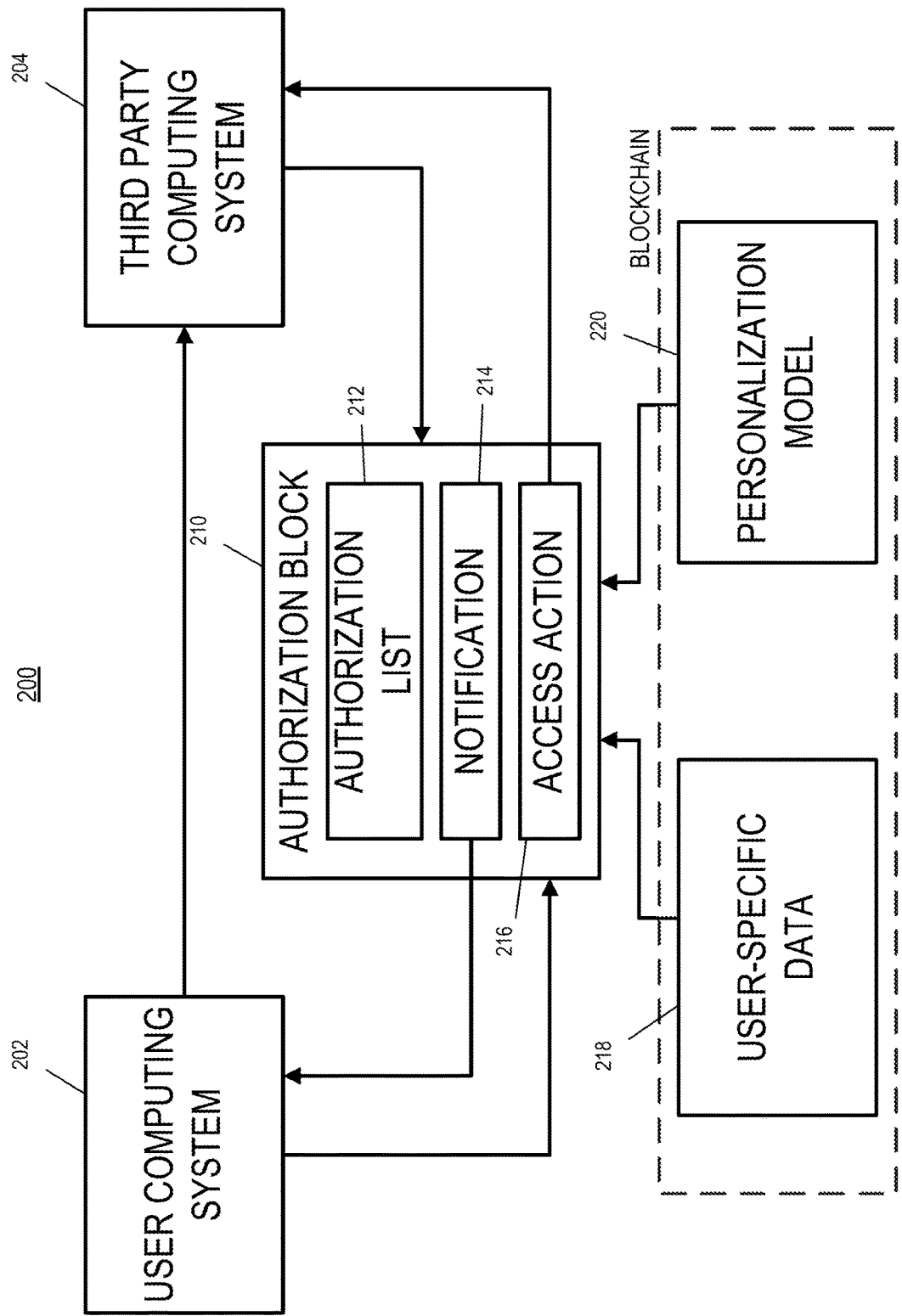
FIG. 2 depicts a block diagram of an example access authorization system according to example embodiments of the present disclosure.

FIG. 2 depicts a block diagram of an example access authorization system according to example embodiments of the present disclosure. In some implementations, the access authorization system 200 can be configured to receive an access request from a third party computing system 204 descriptive of a request to access user data (e.g., user-specific data 218 and/or a personalization model 220) associated with a particular user and, as a result of receipt of the access request from a third party computing system 204, provide access action 216 that is descriptive of a level of access provided to the third party computing system 204. Thus, in some implementations, the access authorization system 200 can include an authorization block 210 that facilitates the authorization determination.

For example, a user computing system 202 can communicate with a third party computing system 204 (e.g., a third party computing system associated with a web platform). The third party computing system 204 can generate an access request in response to the interaction (e.g., the user computing system 202 may send a search query to a search engine associated with the third party computing system 204, which can trigger a request to receive user data to better tailor the search results). The access request can be obtained and processed by an authorization block 210. The authorization block 210 can include one or more deterministic functions. Alternatively and/or additionally, the authorization block 210 can include a machine-learned model trained on previous authorization interactions by the user.

The authorization block 210 can process the access request to determine whether the third party computing system is associated with an authorized entity (e.g., an authorized web domain and/or an authorized web platform) by comparing the identification data against an authorization list 212 of authorized entities. Alternatively and/or additionally, the authorization block 210 can generate a notification 214 that can be sent to the user computing system 202 prompting an input from the user. The authorization block 210 can then receive an authorization input, a semi-authorization input, and/or a no authorization input from the user computing system 202. The authorization block 210 can then determine and/or generate an access action 216 based on the user input. The access action 216 may include providing access to user-specific data 218 and/or a personalization model to the third party computing system 204. In some implementations, the user-specific data 218 and/or the personalization model may be stored on a blockchain. Access to the user-specific data 218 and/or the personalization model 220 can include providing a viewing interface to the third party computing system 204 that allows the third party to view the data and/or interact with the data without augmenting or copying the data.

Figure 3:
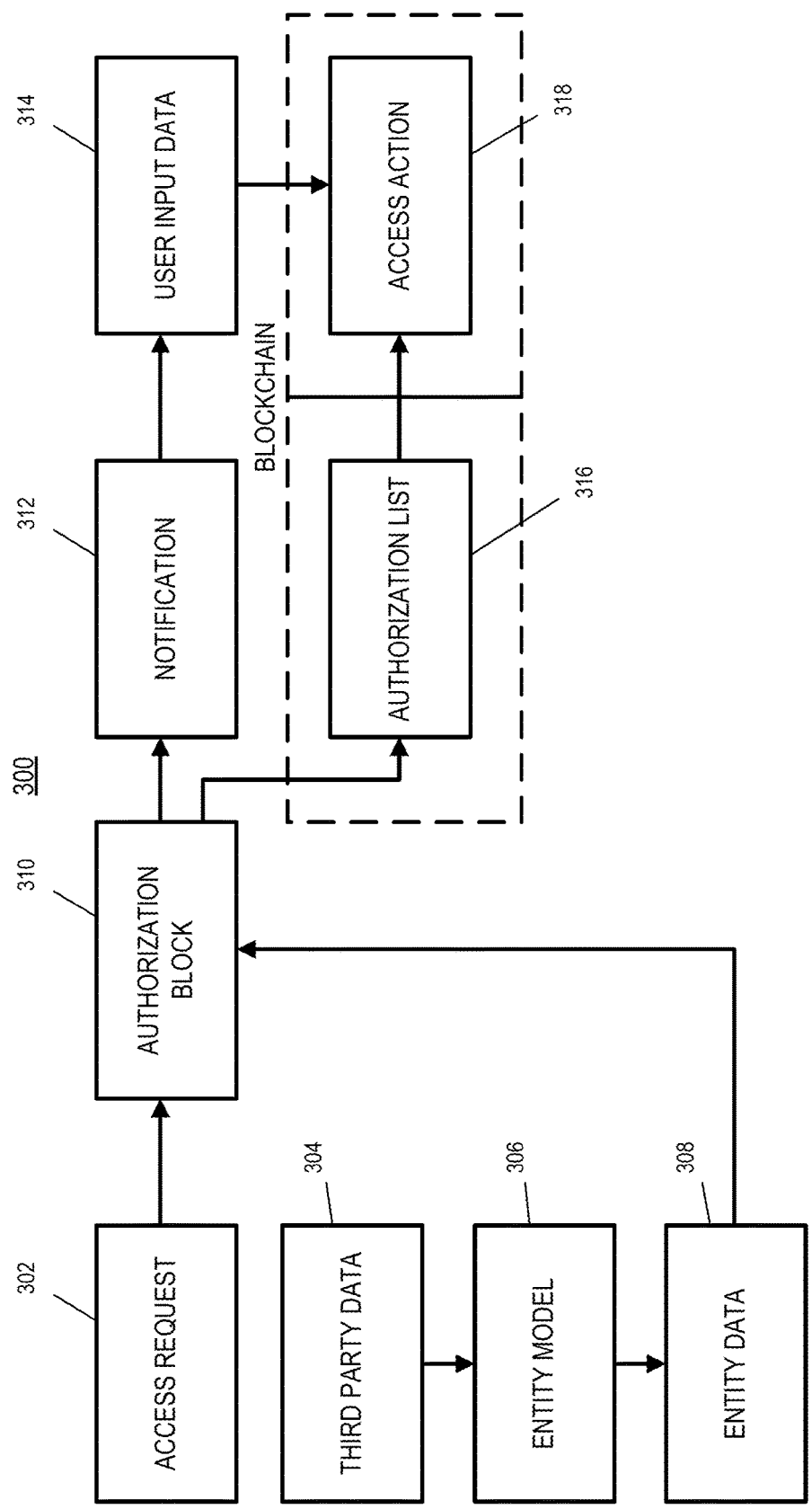
FIG. 3 depicts a block diagram of an example access action determination system according to example embodiments of the present disclosure.

FIG. 3 depicts a block diagram of an example access action determination system 300 according to example embodiments of the present disclosure. In particular, an access request 302 and third party data 304 can be obtained from a third party computing system. The third party data 304 can be processed with an entity model 306 to generate entity data 308. The entity data 308 can be descriptive of a particular entity associated with the third party computing system. Alternatively and/or additionally, the entity data 308 can be descriptive of a type of entity (e.g., a social media entity, a search engine entity, and/or a streaming entity) associated with the third party computing system.

The access request 302 and the entity data 308 can be processed with an authorization block 310. The authorization block 310 may generate a notification 312 descriptive of the access request 302 and the entity data 308. The notification 312 can be transmitted to a user computing system, which can return user input data 314 in response to a selection of a user interface element of the notification 312. For example, a selection of a level of access element in the user interface of the notification 312. An access action 318 can then be determined based on the user input data 314.

Alternatively and/or additionally, the authorization block 310 can obtain an authorization list 316 associated with the particular user. The entity data 308 can be processed with the authorization list 316 to determine if the entity data 308 is associated with a particular line item of the authorization list 316. If an association is determined, the access request and the line item can be compared to determine whether the type of access and/or the level of access meet the pre-authorization type and level for the particular entity or particular entity type. Based on the processing, an access action 318 can be determined. The access action can include providing full access to the user data, access to only certain types of user data, or no access to the user data. Alternatively and/or additionally, the access action 318 can include a read call and/or a write call.

Figure 4:
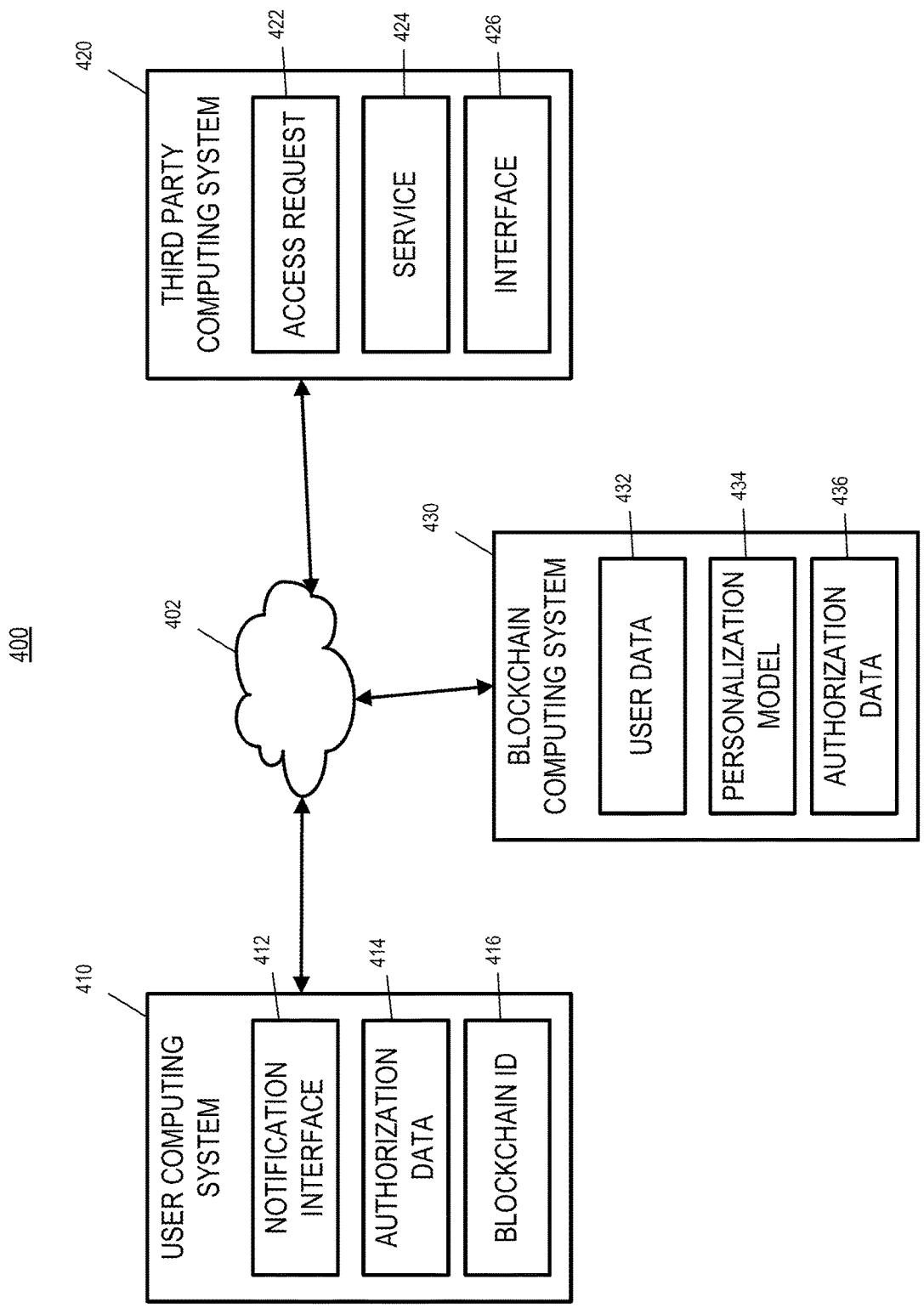
FIG. 4 depicts a block diagram of an example computing system that performs user data access authorization according to example embodiments of the present disclosure.

FIG. 4 depicts a block diagram of an example computing system that performs user data access authorization 400 according to example embodiments of the present disclosure. In particular, the computing system that performs user data access authorization 400 can include a user computing system 410, a third party computing system 420, and/or a blockchain computing system 430. The user computing system 410, the third party computing system 420, and the blockchain computing system 430 can communicate over a network 402. The various computing systems can communicate with one another in order to facilitate the exchange of user data to generate a more user-specific prediction or suggestion with regards to a computer-implemented service provided by the third party web platform.

The user computing system 410 can include a notification interface 412, storage of authorization data 414, and/or a blockchain ID 416. The notification interface 412 can be part of a user interface for providing notifications for display. Additionally and/or alternatively, the notification interface 412 can receive one or more user inputs associated with a selection of a level of access to be provided to the third party web platform. The authorization data 414 can include instructions for determining and/or implementing access actions. Additionally and/or alternatively, the authorization data 414 can include data associated with previous authorization actions. The blockchain ID 416 can include data associated with a blockchain specific profile for the user. The blockchain ID 416 can include public or private keys, token IDs, and/or contract addresses.

The third party computing system 420 can include access request data 422, service operations 424, and/or a third party interface 426. The access request data 422 can be descriptive of a template access request to be sent when collecting data. Alternatively and/or additionally, the access request data 422 can be descriptive of the data requesting to be accessed (e.g., search history data, browsing history data, website-specific data, time-specific data, etc.) and the type of access (e.g., read access, edit access, write access, copy access, delete access, etc.). The service operations 424 can include one or more operations for implementing a web platform, web application, and/or a web service. The service operations 424 may leverage the user data and/or the personalization model for a more user-specific experience. The third party interface 426 can be part of a larger web platform interface.

The blockchain computing system 430 can be a distributed and decentralized computing system. The blockchain computing system 430 can store the user data 432, the personalization model 434, and/or the authorization data 436 over the decentralized and decentralized blockchain. The user data 432, the personalization model 434, and/or the authorization data 436 may be governed by a smart contract such that viewing may occur in response to a trigger event. Additionally and/or alternatively, the user data 432, the personalization model 434, and/or the authorization data 436 may be encrypted via one or more encryption techniques.

Figure 5:
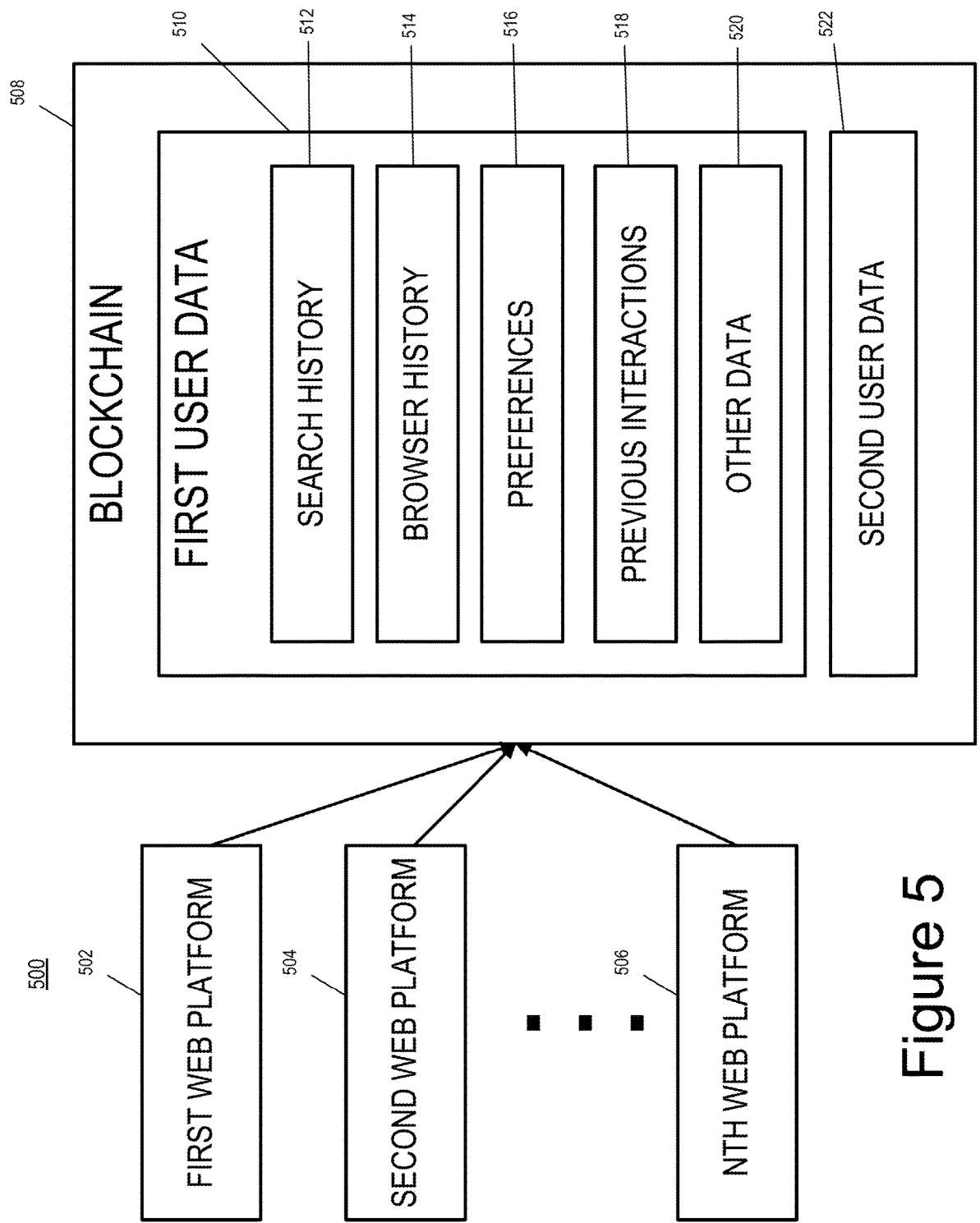
FIG. 5 depicts a block diagram of an example user dataset according to example embodiments of the present disclosure.

FIG. 5 depicts a block diagram of an example user dataset 500 according to example embodiments of the present disclosure. The user data and/or training data for the personalization model may be obtained from a plurality of third party computing systems (e.g., a plurality of web platforms) over a period of time (e.g., years, months, days, hours, minutes, etc.). For example, a first user data 510 associated with a first user and second user data 522 associated with a second user can be stored on a blockchain 508. The first user data 510 and/or the second user data 522 can be generated based on user interactions with a plurality of web platforms, which can include a first web platform 502, a second web platform 504, and/or an nth web platform 506. The user may be able to choose when and to what extent data is obtained from each particular web platform. The permissions may be stored on the blockchain 508.

The first user data 510 can include search history data 512, browser history data 514 preference data 516, previous interaction data, and/or other data 520. The search history data 512 can include search queries, search results, and/or other context associated with the first user. The search history data 512 may be obtained and/or generated based on interactions with a search engine (e.g., the first web platform 502 may be a search engine). The browser history data 514 can include previously visited web pages, contents of the web pages, sequence of web page visits, frequency of web page visits, duration of web page visits, and/or other context associated with the first user. The browser history data 514 may be obtained and/or generated based on interactions with a browser (e.g., the second web platform 504 may be a browser application). The preference data 516 can include one or more preferences associated with the first user. The preference data 516 may be obtained and/or generated based on interactions with a general interface and/or a specific web platform (e.g., the nth web platform 506 may be a social media web platform). The previous interaction data 518 can include likes on a social media platform, messages in a web messenger, previously watched videos, previously listened to audio files, and/or comments left on a blog. The other data 520 may be manually input, automatically inferred, and/or automatically aggregated.

Example Methods

Figure 6:
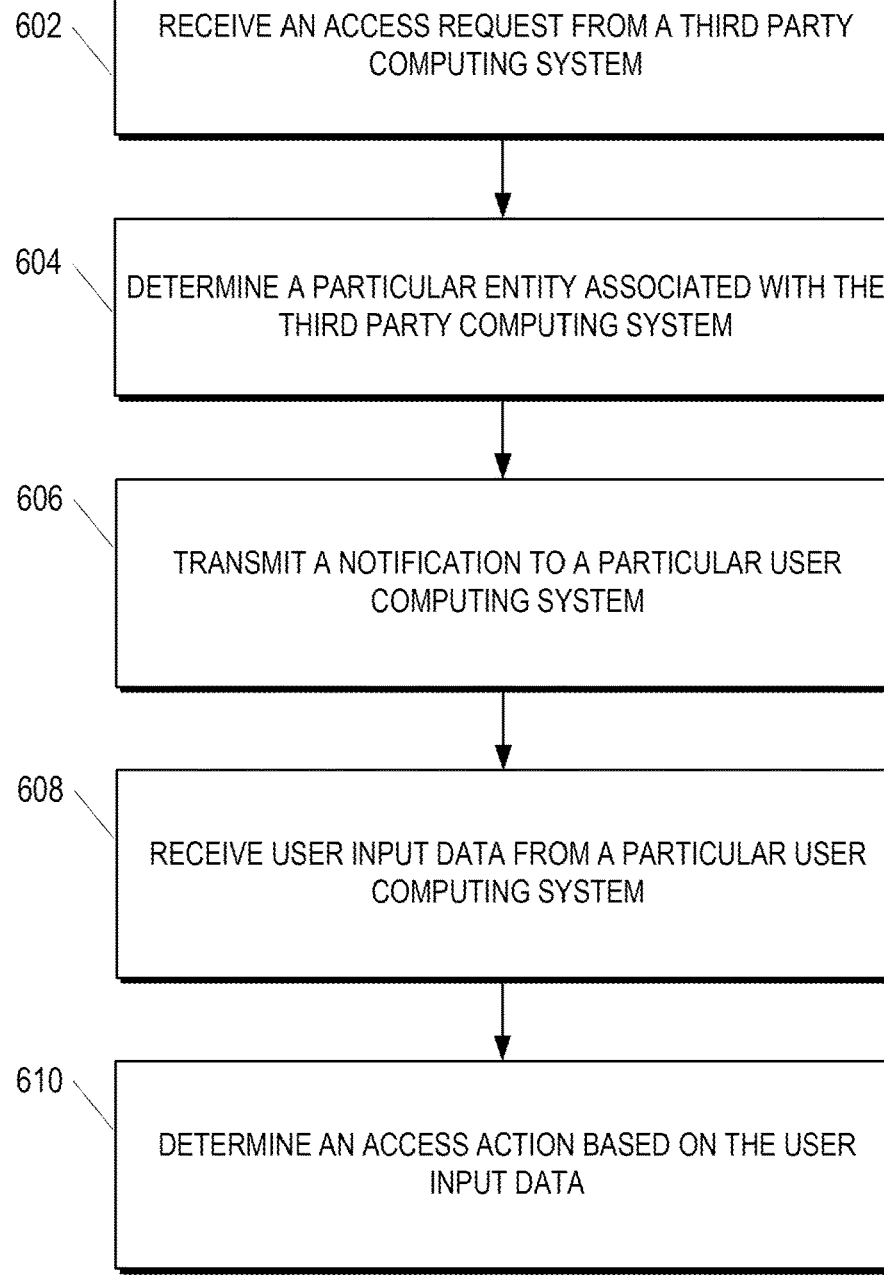
FIG. 6 depicts a flow chart diagram of an example method to perform user data access authorization according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can receive an access request from a third party computing system. In some implementations, the access request can be descriptive of a request to access user data for a particular user. The user data can be stored on a blockchain (e.g., a distributed, decentralized blockchain that is associated with a blockchain computing system). In some implementations, the user data can include search history data descriptive of previously input search queries. The search history data can include previous search queries, search results, times of search queries, and/or a category associated with the search. The user data can include browser history data associated with the user (e.g., associated with a user computing system associated with the user). The browser history data can include previously visited web pages, times of visits, and/or other related metadata. Additionally and/or alternatively, the user data can include preference data descriptive of one or more user preferences. The preference data may have been generated based on one or more user inputs to a preference interface. Alternatively and/or additionally, the preference data may have been generated based on one or more user interactions in a previously-visited web platform. The preference data can be descriptive of notification preferences, clothes preferences and sizes, preferred addresses (e.g., preferred mailing address and/or a preferred email address), viewing preferences (e.g., dark mode versus light mode, portrait versus landscape, etc.), and/or vulgarity preference (e.g., child protection settings).

At 604, the computing system can determine a particular entity associated with the third party computing system. The particular entity can be associated with a web platform. In some implementations, the particular entity can be a social media entity. Alternatively and/or additionally, the particular entity can be a search engine entity. The particular entity may include a transaction platform. The determination can be based on third party input data, metadata, computing system identifiers, profile data, web domain data, and/or a web address.

At 606, the computing system can transmit a notification to a particular user computing system. The particular user computing system can be associated with the particular user. In some implementations, the notification can be descriptive of the access request and the particular entity. The transmission can occur via a network. The notification can be generated based on the type of access request and/or based on the type of entity. The notification can be a push notification sent to a mobile device of the user (e.g., an authentication notification sent to a dual authentication mobile application). Alternatively and/or additionally, the notification can include a one-time access option, a termed access option (e.g., for a day, for a week, for a month, and/or for a year), and/or a continuous access option (e.g., to allow continuous access authorization until a future action occurs).

At 608, the computing system can receive user input data from a particular user computing system. The user input data can be descriptive of a user response to the access request. The user input data can be descriptive of a selection of an option provided via the user interface of the notification. The user input data can be descriptive of a user selection to provide data access to the third party computing system.

At 610, the computing system can determine an access action based on the user input data. The access action can be descriptive of a level of access to be provided to the third party computing system to the user data on the blockchain. The level of access can be full access, restricted access, specific access, and/or no access. The access action can include instructions for causing an application programming interface to interface with a blockchain to provide access to the user data.

In some implementations, the access action can include providing the user data to the third party computing system. Alternatively and/or additionally, the access action can include providing a subset of the user data to the third party computing system. The subset of the user data can be identified and provided based in part on the user input data. For example, the user input data can include specific instructions on which data can be accessed by the particular third party computing system.

In some implementations, the access action can include generating a second notification based on the user input data and providing the second notification to the third party computing system. The second notification can be descriptive of the level of access granted. Additionally and/or alternatively, the second notification can include a user interface for accessing the user data.

Alternatively and/or additionally, the access action can include accessing a blockchain node based on the access request and identifying blockchain data associated with the particular user. The blockchain data can include the user data being requested by the third party computing system.

In some implementations, the access action can include determining identification data associated with the particular user. The identification data can be descriptive of user-specific blockchain identification information. The access action can include identifying blockchain data associated with the user based on the identification data.

Figure 7:
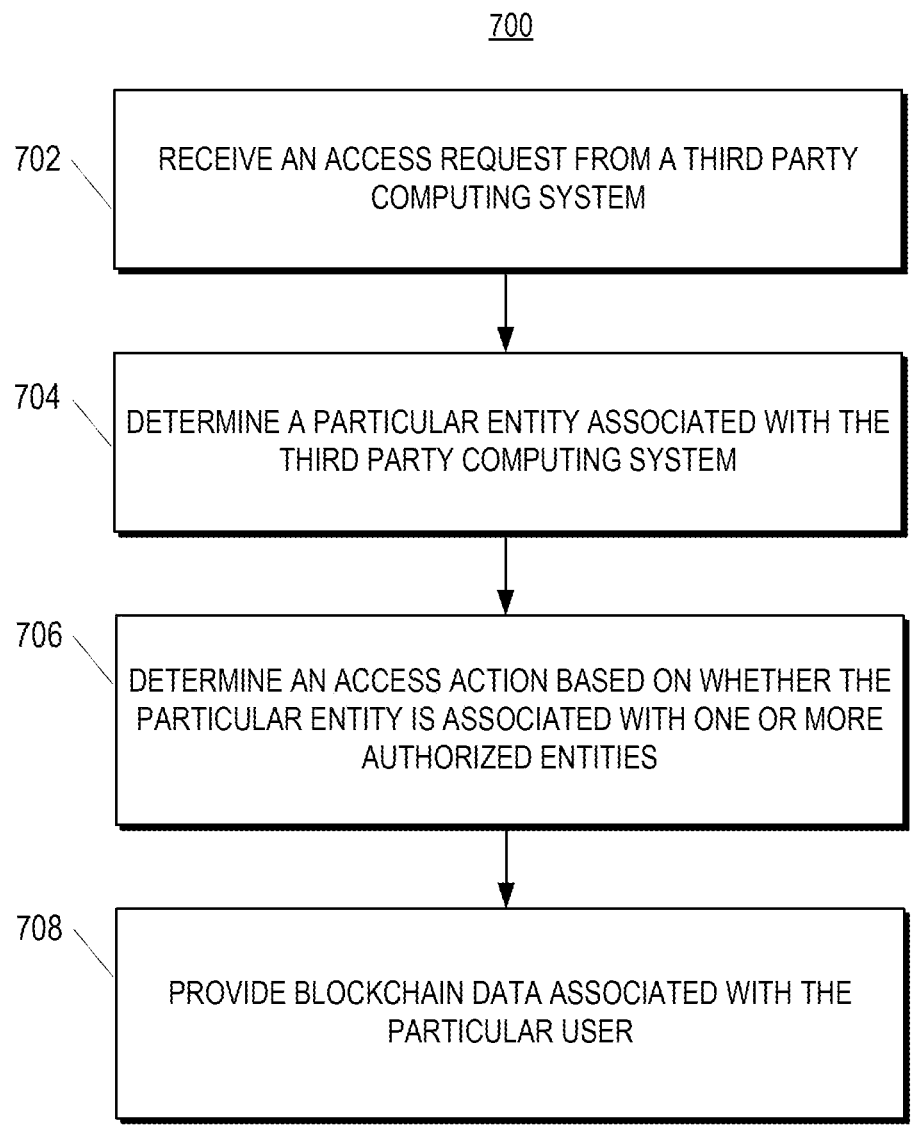
FIG. 7 depicts a flow chart diagram of an example method to perform personalization model access authorization according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can receive an access request from a third party computing system. The access request can be descriptive of a request to access a personalization model associated with a particular user. The personalization model can be stored on a blockchain. In some implementations, the personalization model can include a machine-learned model trained on user data associated with the particular user. The personalization model can be utilized to provide user-specific predictions and/or user-specific suggestions. The predictions and/or the suggestions can be based on past interactions by the user. The training data for the personalization model can include data obtained from a plurality of entities and/or a plurality of websites.

At 704, the computing system can determine a particular entity associated with the third party computing system. The particular entity can be associated with a web platform. In some implementations, the particular entity can be a search engine entity.

At 706, the computing system can determine an access action based on whether the particular entity is associated with one or more authorized entities. The one or more authorized entities can be determined based on one or more user inputs. Alternatively and/or additionally, the one or more authorized entities can be determined based on the entity being listed in an authorized entities list. The access action can include utilizing the personalization model to adjust a ranking of one or more search results. Alternatively and/or additionally, the access action can include obtaining additional data from the third party computing system in order to retrain the personalization model. For example, the additional data can be added to a corpus of training data, which can then be utilized to retrain the personalization model.

In some implementations, the access action can include obtaining input data from the third party computing system, processing the input data with the personalization model to generate output data, and providing the output data to the third party computing system. The output data can include search results, ranking data, prediction data, and/or suggestion data.

Alternatively and/or additionally, the access action can include adjusting one or more parameters of the personalization model based on additional data obtained from the third party computing system. The parameter adjustment can be based on additional data provided by the third party computing system.

At 708, the computing system can provide blockchain data associated with the particular user. The blockchain data can be associated with a particular blockchain. In some implementations, the blockchain data can include access to the personalization model.

Figure 8:
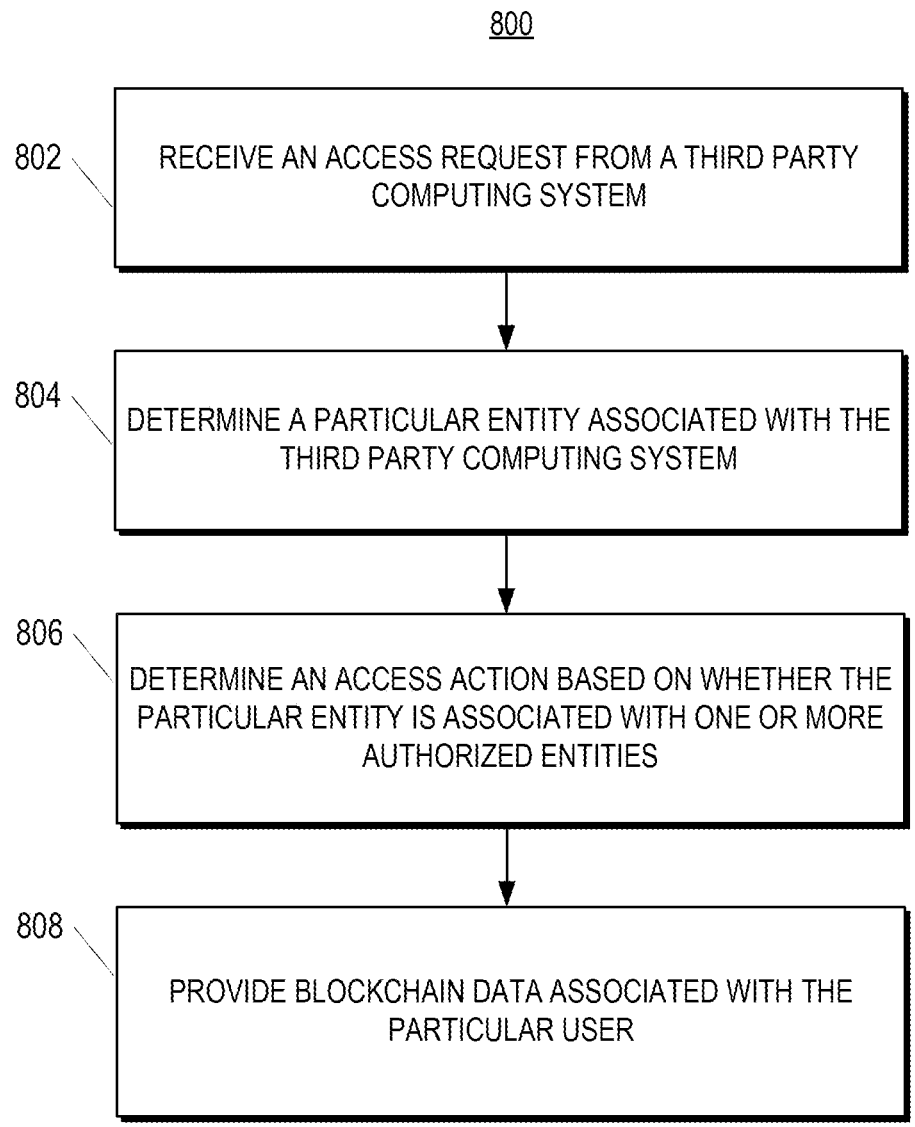
FIG. 8 depicts a flow chart diagram of an example method to perform access authorization according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can receive an access request from a third party computing system. The access request can be descriptive of a request to access user specific data associated with a particular user. In some implementations, the user-specific data can be stored on a blockchain. The blockchain can include a particular blockchain associated with a particular blockchain computing system.

At 804, the computing system can determine a particular entity associated with the third party computing system. The particular entity can be associated with a web platform. The web platform can include a search engine, a social media platform, a transaction platform, a profile management platform, and/or a streaming platform.

At 806, the computing system can determine an access action based on whether the particular entity is associated with one or more authorized entities. The one or more authorized entities can be determined based on a user selection of a user interface element in a notification. In some implementations, the notification can be descriptive of the particular entity and the access request. The one or more authorized entities may be stored in a profile database. The profile database may be stored locally on a user computing system and/or on the blockchain.

At 808, the computing system can provide blockchain data associated with the particular user. The blockchain data can be associated with a particular blockchain. The blockchain data can include access to the user-specific data. Alternatively and/or additionally, the blockchain data can include the user-specific data.

In some implementations, the systems and methods can include augmenting the user data based on third party data obtained from the third party computing system. The augmentation can include overwriting pre-existing data. Alternatively and/or additionally, the augmentation can include deleting and/or adding to pre-existing data.

Additionally and/or alternatively, the systems and methods can include generating additional data based on one or more interactions with the third party computing system and storing the additional data on the blockchain. Storing the additional data can include storing the additional data with a token ID associated with the particular user.

In some implementations, the systems and methods can include performing, via an application programming interface, an edit action. The edit action can include interacting with the blockchain. The edit action can include editing the user data associated with the particular user.

Figure 10:
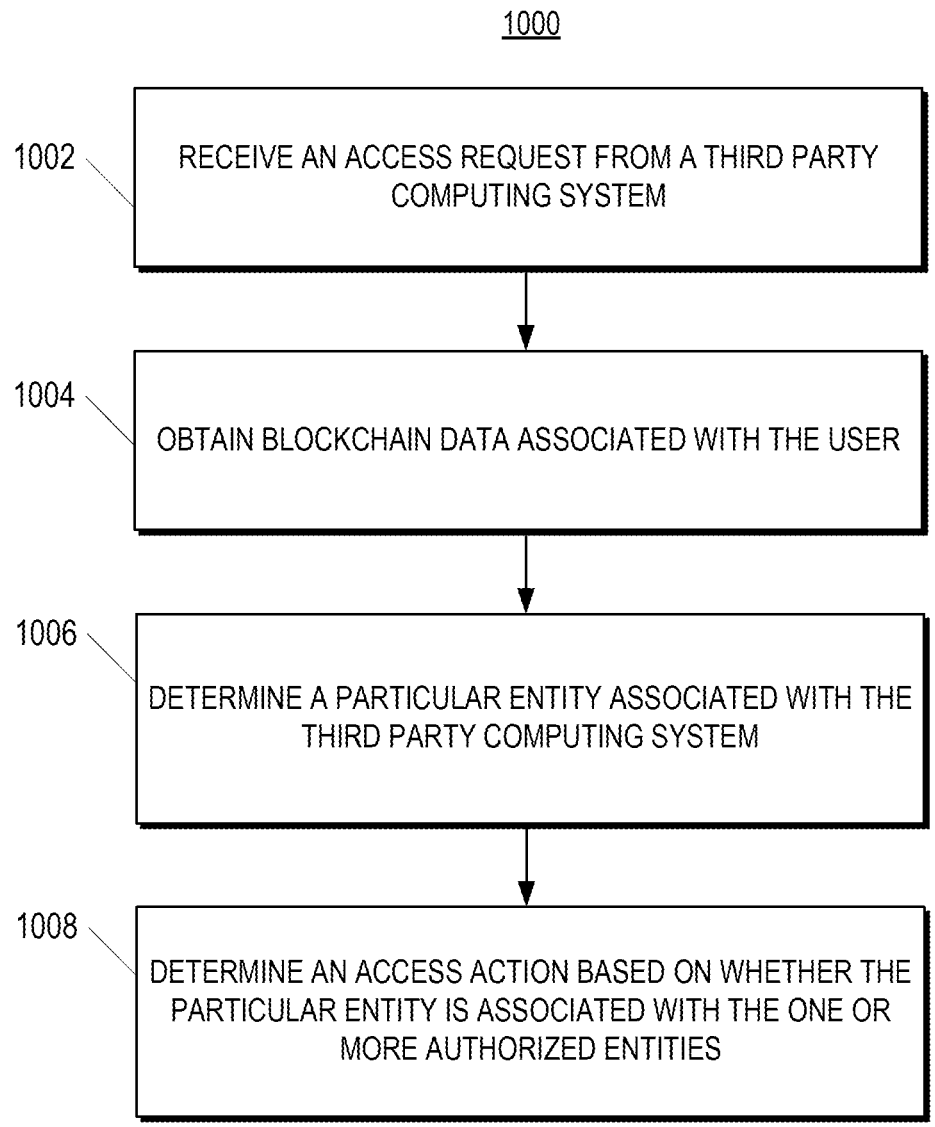
FIG. 10 depicts a flow chart diagram of an example method to perform user data access authorization according to example embodiments of the present disclosure.

FIG. 10 depicts a flow chart diagram of an example method to perform according to example embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can receive an access request from a third party computing system. The access request can be descriptive of a request to access user data for a particular user. The third party computing system can be associated with a particular web platform and/or a particular web service provider. The access request can be generated and obtained in response to a user interaction with a third party user interface.

At 1004, the computing system can obtain blockchain data associated with the user. The blockchain data can be associated with a particular blockchain. In some implementations, the blockchain data can be descriptive of one or more authorized entities allowed to access the user data. The user data can include search history data descriptive of previously searches and/or previously viewed web pages. Alternatively and/or additionally, the user data can include preference data descriptive of one or more user preferences. The preference data may have been generated based on one or more user inputs to a preference interface. In some implementations, the preference data may have been generated based on one or more user interactions in a previously-visited web platform.

In some implementations, obtaining the blockchain data associated with the user can include accessing a blockchain node based on the access request and identifying the blockchain data associated with the user. The blockchain data can be descriptive of an authorization list that lists the one or more authorized entities.

Alternatively and/or additionally, obtaining the blockchain data associated with the user can include determining identification data associated with the user. The identification data can be descriptive of user-specific blockchain identification information. Obtaining the blockchain data associated with the user can include identifying the blockchain data associated with the user based on the identification data.

At 1006, the computing system can determine a particular entity associated with the third party computing system. The particular entity can be associated with a web platform. In some implementations, the particular entity can be a social media entity. Alternatively and/or additionally, the particular entity can be a search engine entity.

At 1008, the computing system can determine an access action based on whether the particular entity is associated with the one or more authorized entities. The access action can include causing an application programming interface to interact with a database to obtain the user data. Alternatively and/or additionally, the access action can include providing read access to the user data. In some implementations, the access action can include providing write access to the user data.

In some implementations, the access action can include providing the user data to the third party computing system. Alternatively and/or additionally, the access action can include providing a subset of the user data to the third party computing system.

In some implementations, the access action can include generating a notification based on whether the particular entity is associated with the one or more authorized entities and providing the notification to the third party computing system.

Figure 11:
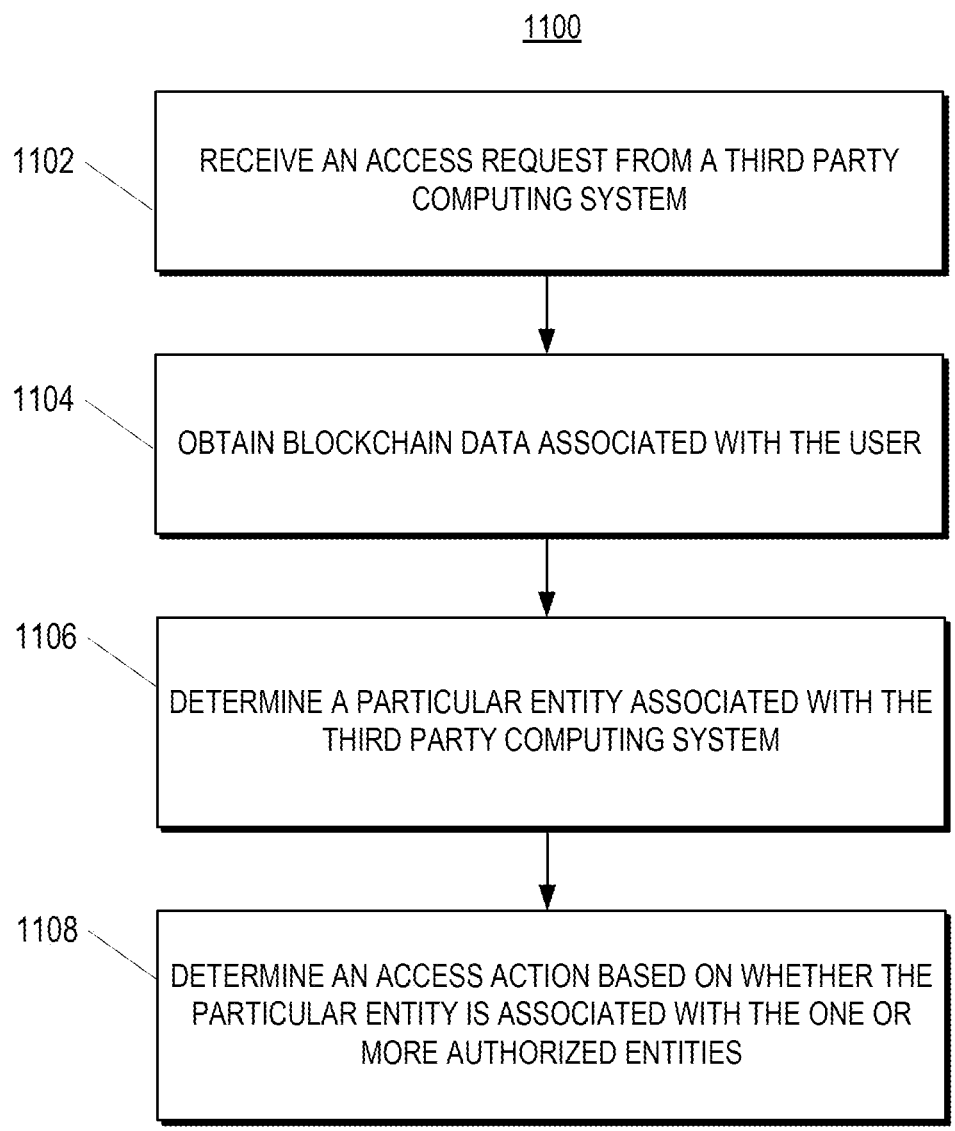
FIG. 11 depicts a flow chart diagram of an example method to perform personalization model access authorization according to example embodiments of the present disclosure.

FIG. 11 depicts a flow chart diagram of an example method to perform according to example embodiments of the present disclosure. Although FIG. 11 depicts steps performed in a particular order for purposes of illustration and discussion, the methods of the present disclosure are not limited to the particularly illustrated order or arrangement. The various steps of the method 1100 can be omitted, rearranged, combined, and/or adapted in various ways without deviating from the scope of the present disclosure.

At 1102, a computing system can receive an access request from a third party computing system. The access request can be descriptive of a request to access a personalization model associated with a particular user. The personalization model can be trained based on user data obtained based on past interactions by a user. In some implementations, the personalization model can be search specific, content suggestion specific, and/or preference specific. The personalization model can be one of a plurality of personalization models associated with the particular user.

At 1104, the computing system can obtain blockchain data associated with the user. In some implementations, the blockchain data can be associated with a particular blockchain. The blockchain data can be descriptive of one or more authorized entities allowed to access the personalization model. The personalization model can include a machine-learned model trained on user data associated with the particular user. The one or more authorized entities can be based on past user inputs obtained from a user computing system.

At 1106, the computing system can determine a particular entity associated with the third party computing system. The particular entity can be associated with a web platform. In some implementations, the particular entity can be a search engine entity. The access action can include utilizing the personalization model to adjust a ranking of one or more search results. The particular entity can be based on a Web3 profile and/or a Web3 identifier.

At 1108, the computing system can determine an access action based on whether the particular entity is associated with the one or more authorized entities. The access action can include providing the personalization model to the third party computing system for model inference. Alternatively and/or additionally, the access action can include obtaining input data from the third party computing system, processing the input data with the personalization model to generate output data, and providing the output data to the third party computing system.

Additionally and/or alternatively, the access action can include adjusting one or more parameters of the personalization model based on additional data obtained from the third party computing system.

Figure 12:
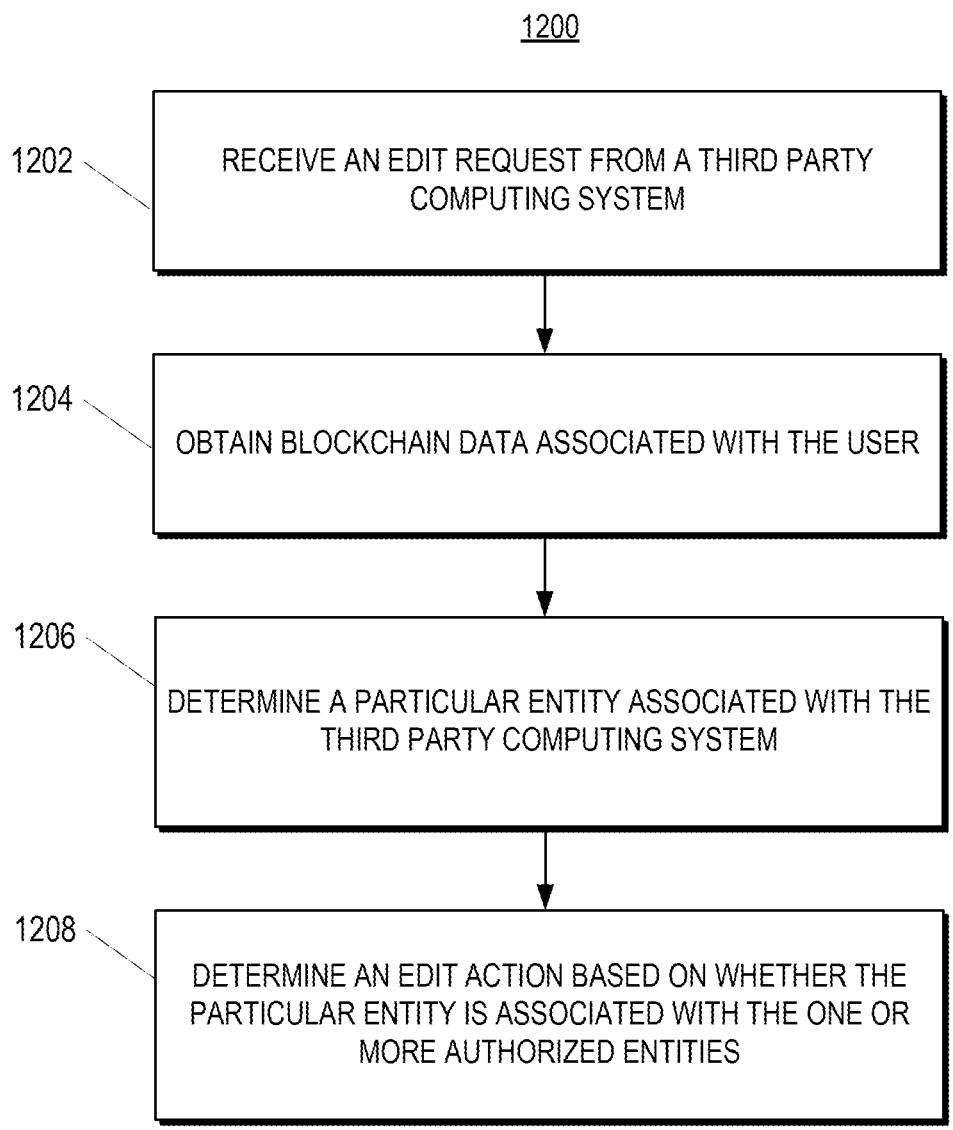
FIG. 12 depicts a flow chart diagram of an example method to perform access authorization according to example embodiments of the present disclosure.

FIG. 12 depicts a flow chart diagram of an example method to perform according to example embodiments of the present disclosure. Although FIG. 12 depicts steps performed in a particular order for purposes of illustration and discussion, the methods of the present disclosure are not limited to the particularly illustrated order or arrangement. The various steps of the method 1200 can be omitted, rearranged, combined, and/or adapted in various ways without deviating from the scope of the present disclosure.

At 1202, a computing system can receive an edit request from a third party computing system. The edit request can be descriptive of a request to edit user data for a particular user. The edit request can be based on the particular user being a repeat interactor with a web platform associated with the third party computing system.

At 1204, the computing system can obtain blockchain data associated with the user. The blockchain data can be associated with a particular blockchain. In some implementations, the blockchain data can be descriptive of one or more authorized entities allowed to edit the user data.

At 1206, the computing system can determine a particular entity associated with the third party computing system. The entity determination can be based on preexisting data stored by the system in an entity database. Alternatively and/or additionally, the entity can be determined by obtaining third party data associated with the third party computing system and querying a search engine with the obtained third party data.

At 1208, the computing system can determine an edit action based on whether the particular entity is associated with the one or more authorized entities. The edit action can include augmenting the user data. The augmentation can include deleting pre-existing data. Alternatively and/or additionally, the augmentation can include adding additional data to the user data.

In some implementations, the edit action can include generating additional data based on one or more interactions with the third party computing system and storing the additional data on the particular blockchain.

In some implementations, the systems and methods can include performing, via an application programming interface, the edit action. The edit action can include interacting with the particular blockchain.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
   receiving, by a computing system comprising one or more processors, an access request from a third party computing system, wherein the access request is descriptive of a request to access a personalization model associated with a particular user, wherein the personalization model is stored on a blockchain, and wherein the personalization model is trained on training data from a plurality of entities;
   determining, by the computing system, a particular entity associated with the third party computing system, wherein the particular entity is associated with a web platform;
   determining, by the computing system, an access action based on whether the particular entity is associated with one or more authorized entities, wherein the one or more authorized entities are determined based on one or more user inputs, wherein the access action is associated with adjusting parameters of the personalization model;
   adjusting, by the computing system, one or more parameters of the personalization model based on additional data obtained from the third party computing system; and
   providing, by the computing system, blockchain data associated with the particular user, wherein the blockchain data is associated with a particular blockchain, wherein the blockchain data comprises access to the personalization model.

2. The method of claim 1, wherein the access action comprises:
   obtaining, by the computing system, input data from the third party computing system;
   processing, by the computing system, the input data with the personalization model to generate output data; and
   providing, by the computing system, the output data to the third party computing system.

3. The method of claim 1, wherein the personalization model comprises a machine-learned model trained on user data associated with the particular user.

4. The method of claim 1, wherein the particular entity is a search engine entity, and wherein the access action further comprises utilizing the personalization model to adjust a ranking of one or more search results.

5. A computing system, the system comprising:
   one or more processors; and one or more non-transitory computer-readable media that collectively store instructions that, when executed by the one or more processors, cause the computing system to perform operations, the operations comprising:
receiving an access request from a third party computing system, wherein the access request is descriptive of a request to access a personalization model associated with a particular user, wherein the personalization model is stored on a blockchain, and wherein the personalization model is trained on training data from a plurality of entities;
determining a particular entity associated with the third party computing system, wherein the particular entity is associated with a web platform;
determining an access action based on whether the particular entity is associated with one or more authorized entities, wherein the one or more authorized entities are determined based on one or more user inputs, wherein the access action is associated with adjusting parameters of the personalization model;
adjusting one or more parameters of the personalization model based on additional data obtained from the third party computing system; and
providing blockchain data associated with the particular user, wherein the blockchain data is associated with a particular blockchain, wherein the blockchain data comprises access to the personalization model.

6. The system of claim 5, wherein the operations further comprise:
transmitting a notification to a particular user computing system, wherein the particular user computing system is associated with the particular user, wherein the notification is descriptive of the access request and the particular entity; and
receiving user input data from a particular user computing system, wherein the user input data is descriptive of a user response to the access request.

7. The system of claim 6, wherein the access action further comprises:
generating a second notification in response to adjusting one or more parameters of the personalization model based on additional data obtained from the third party computing system; and
providing the second notification to the third party computing system.

8. The system of claim 5, wherein the personalization model comprises a machine-learned model further trained on user data associated with the particular user.

9. The system of claim 8, wherein the user data comprises search history data descriptive of previously input search queries.

10. The system of claim 8, wherein the user data comprises preference data descriptive of one or more user preferences.

11. The system of claim 10, wherein the preference data was generated based on one or more user interactions in a previously-visited web platform.

12. The system of claim 5, wherein the access action comprises:
accessing a blockchain node based on the access request;
identifying blockchain data associated with the particular user; and
obtaining the personalization model.

13. The system of claim 5, wherein the particular entity is a social media entity.

14. The system of claim 5, wherein the particular entity is a search engine entity.

15. One or more non-transitory computer-readable media that collectively store instructions that, when executed by one or more computing devices, cause the one or more computing devices to perform operations, the operations comprising:
receiving an access request from a third party computing system, wherein the access request is descriptive of a request to access a personalization model associated with a particular user, wherein the personalization model is stored on a blockchain, and wherein the personalization model is trained on training data from a plurality of entities;
determining a particular entity associated with the third party computing system, wherein the particular entity is associated with a web platform;
determining an access action based on whether the particular entity is associated with one or more authorized entities, wherein the one or more authorized entities are determined based on one or more user inputs, wherein the access action is associated with adjusting parameters of the personalization model;
adjusting one or more parameters of the personalization model based on additional data obtained from the third party computing system; and
providing blockchain data associated with the particular user, wherein the blockchain data is associated with a particular blockchain, wherein the blockchain data comprises access to the personalization model.

16. The one or more non-transitory computer-readable media of claim 15, wherein the operations further comprise:
generating the additional data based on one or more interactions with the third party computing system.

17. The one or more non-transitory computer-readable media of claim 15, wherein determining the access action based on whether the particular entity is associated with the one or more authorized entities comprises accessing an authorization list.

18. The one or more non-transitory computer-readable media of claim 15, wherein determining the access action based on whether the particular entity is associated with the one or more authorized entities comprises processing the access request with an authorization block.

19. The one or more non-transitory computer-readable media of claim 18, wherein the authorization block comprises a machine-learned model.

20. The one or more non-transitory computer-readable media of claim 19, wherein the machine-learned model was trained on previous authorization interactions by the particular user.

* * * * *